April 12, 1960
A. W. NELSON
2,932,462
REEL-WINDING APPARATUS
Filed April 4, 1958
7 Sheets-Sheet 1
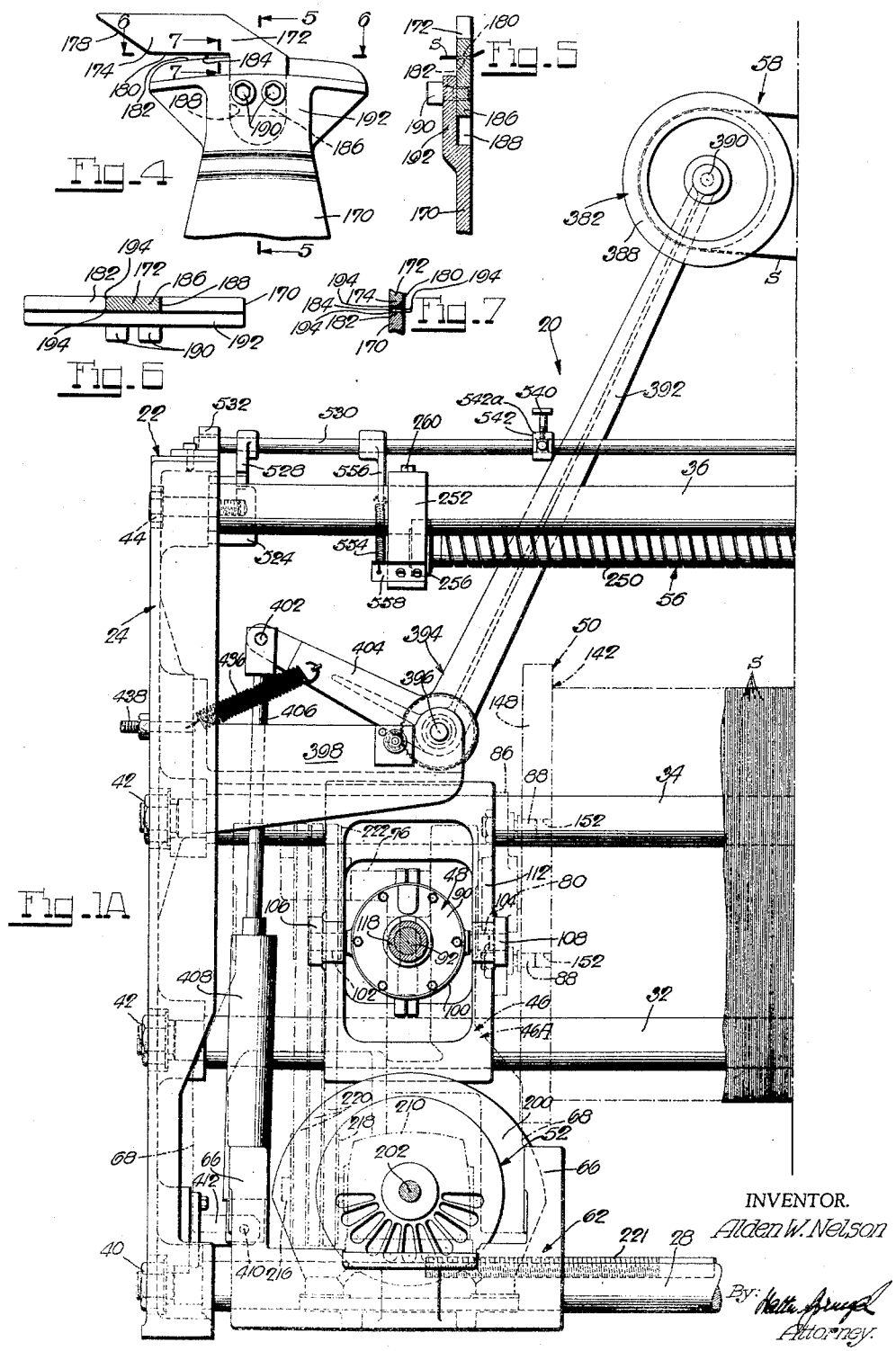
INVENTOR.
Alden W. Nelson

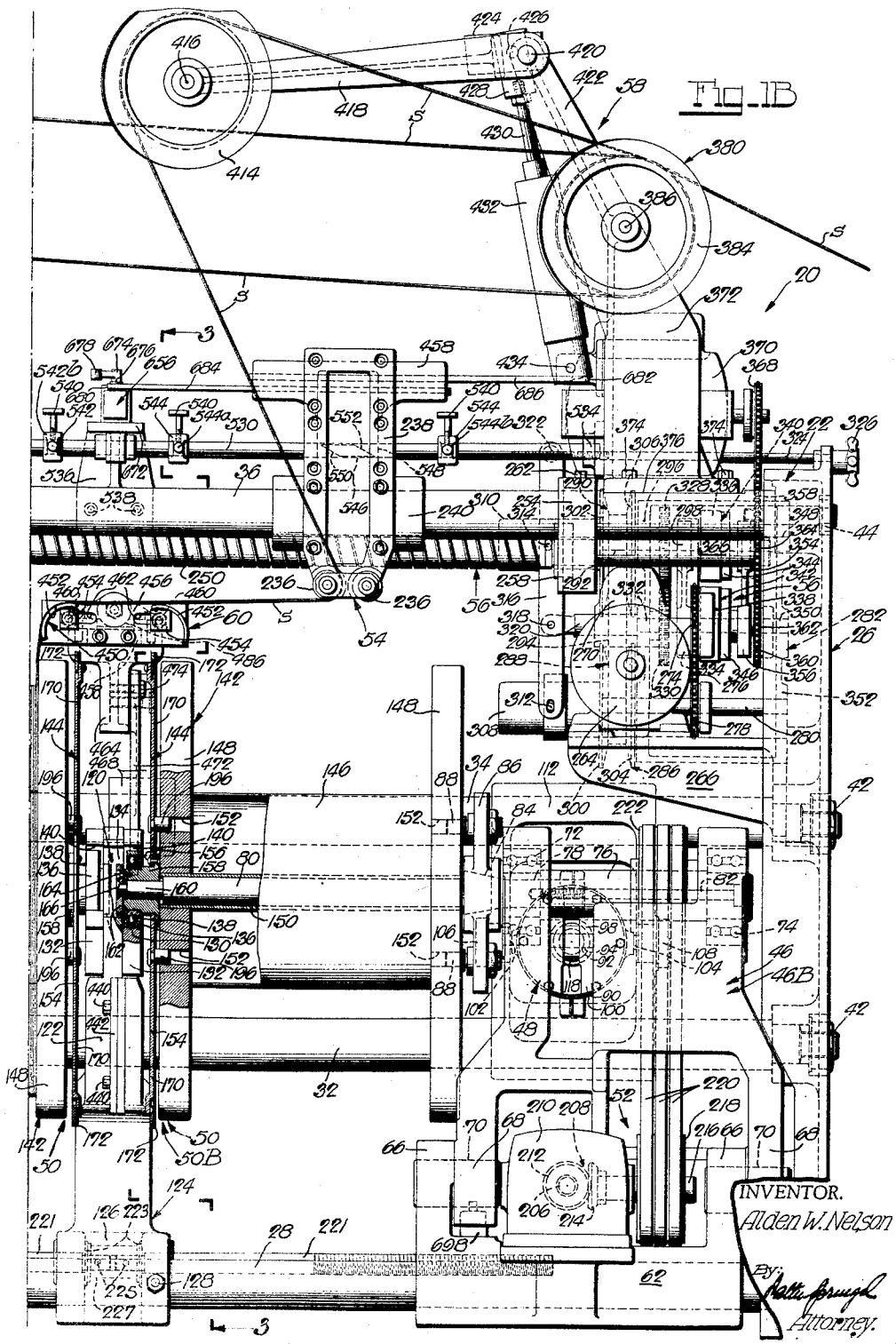

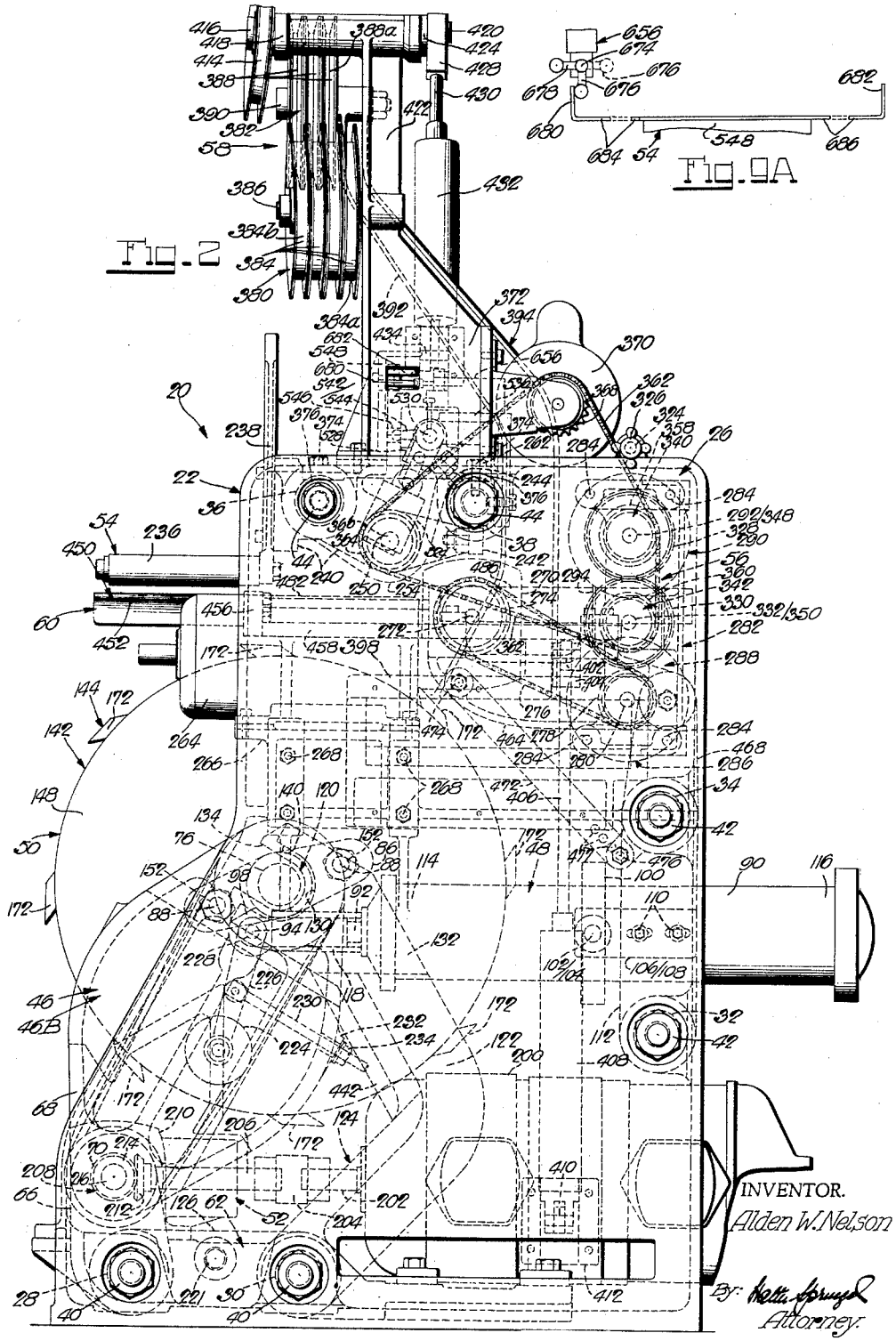

April 12, 1960
A. W. NELSON
2,932,462
REEL-WINDING APPARATUS
Filed April 4, 1958
7 Sheets-Sheet 4
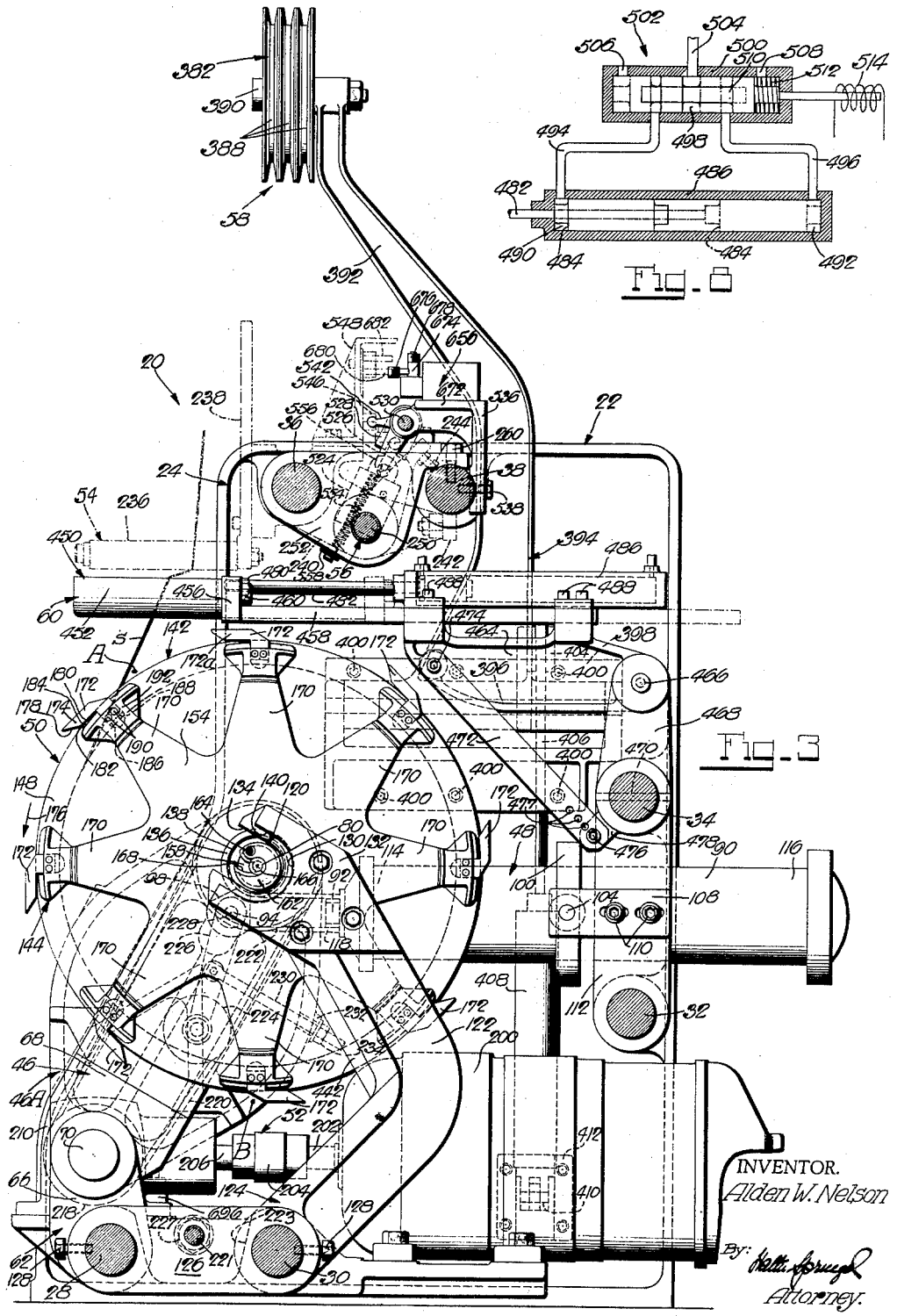
INVENTOR.
Alden W. Nelson
By
Attorney.

April 12, 1960 A. W. NELSON 2,932,462
REEL-WINDING APPARATUS
Filed April 4, 1958 7 Sheets-Sheet 5
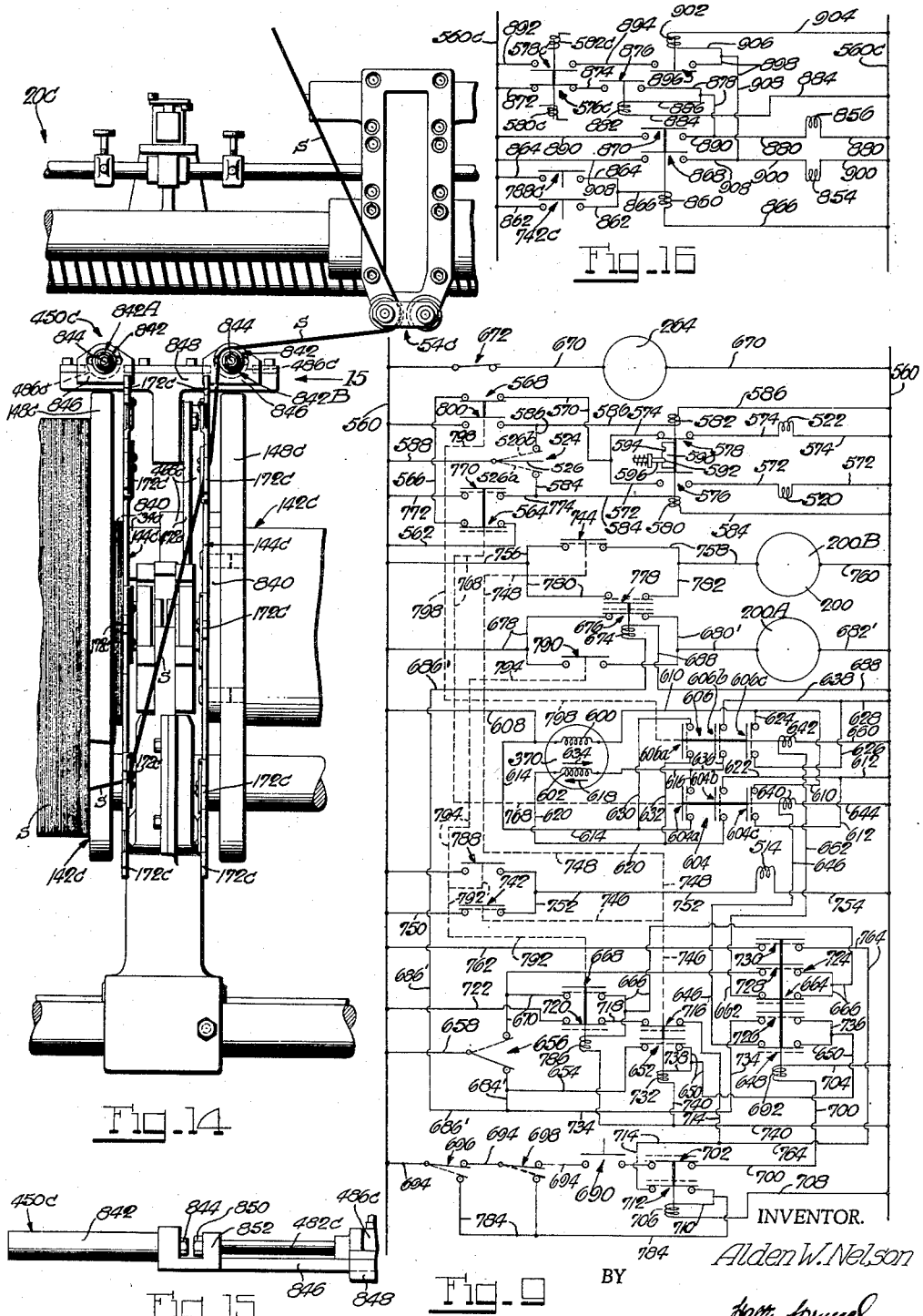
INVENTOR.
Alden W. Nelson
BY
Attorney.

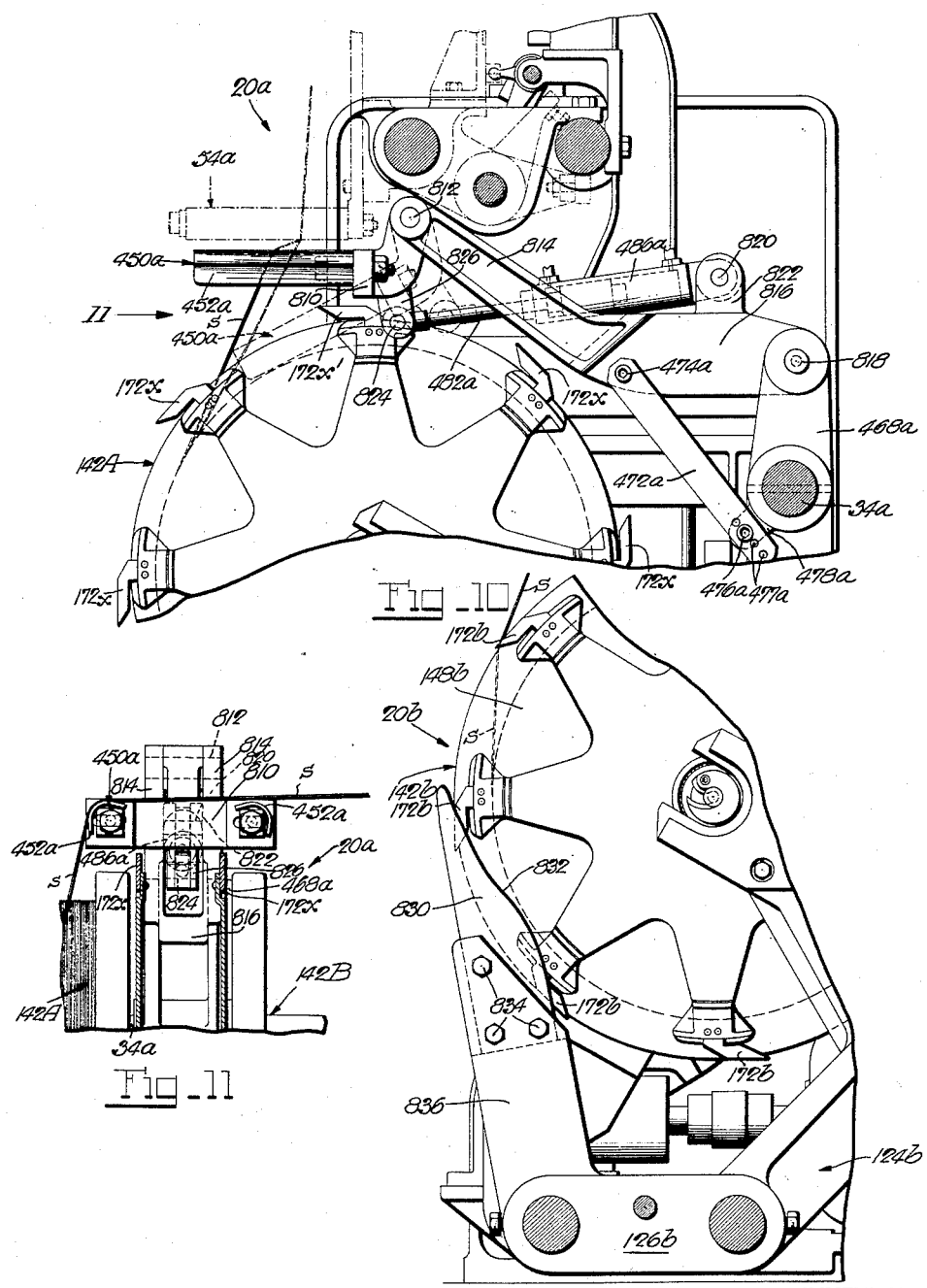

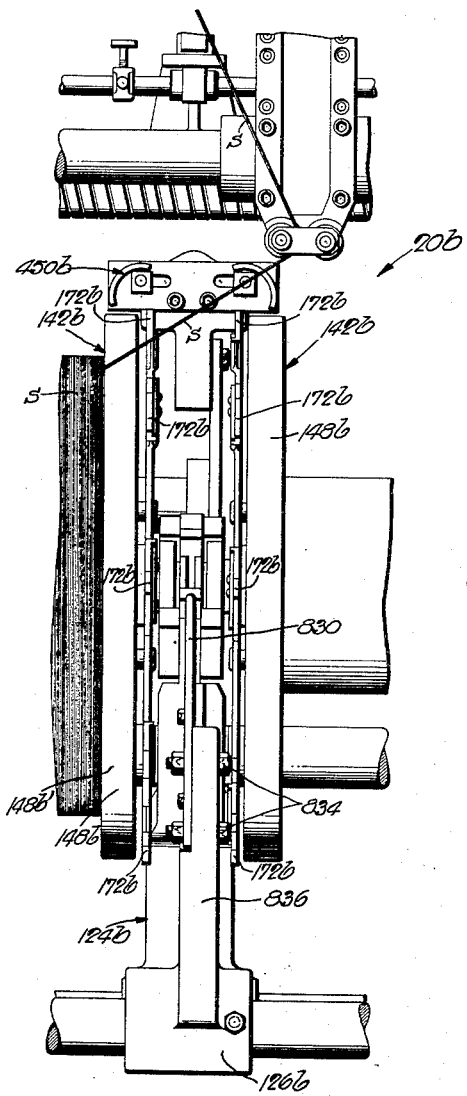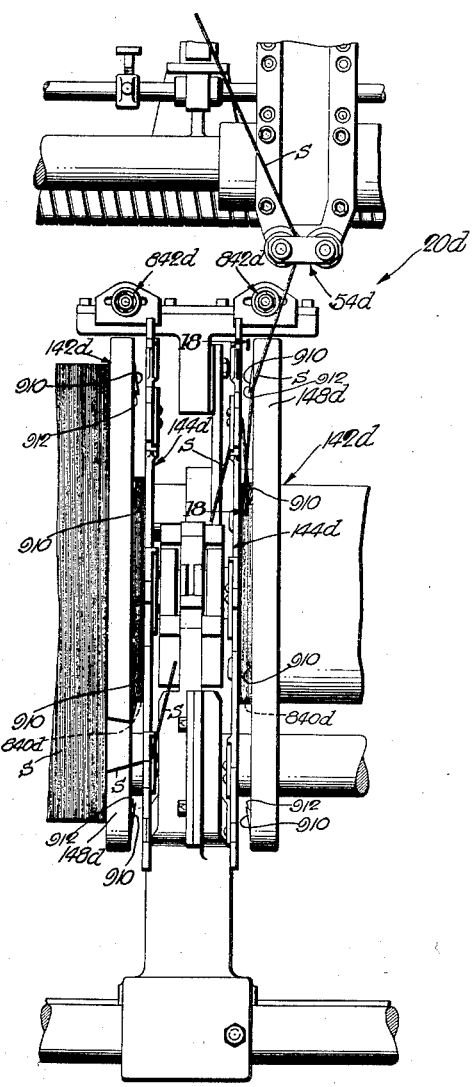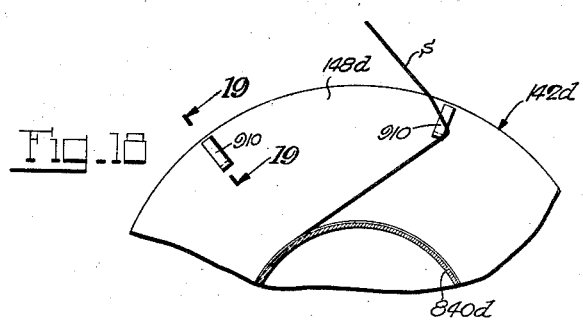

United States Patent Office 2,932,462
Patented Apr. 12, 1960

2,932,462

REEL-WINDING APPARATUS

Alden W. Nelson, Mystic, Conn., assignor to Franklin Research Corporation, Boston, Mass., a corporation of Delaware Application April 4, 1958, Serial No. 726,500

25 Claims. (Cl. 242—25)

This invention relates generally to reel winding apparatus, and more particularly to apparatus for winding continuously fed flexible stock on reels.

Reel winding apparatus of the type to which the present invention relates takes in continuously delivered stock and winds it in predetermined lengths on successive reels for its convenient storage and transport until put to its ultimate use. Reel winding apparatus to which the present invention relates more particularly is of the type having provisions for removably supporting two reels side-by-side, one reel being wound at a time until full, whereupon the other reel is wound while the full reel is removed from the apparatus and replaced by an empty reel to be wound next. Reels are thus alternately wound in the apparatus and replaced by empty reels until a continuous supply stock is fully wound on reels. The reels in the apparatus are separately power-driven under suitable control, and the stock is directed into the respective reels in orderly lays by a traverse guide which moves back and forth for this purpose, and which also crosses over from wind-on relation with each full reel into wind-on relation with the adjacent empty reel so as to maintain the stock winding operation continuous. To this end, the drive of the empty reel is started when the other reel is nearly wound so that both reels will be driven when the latter reel is fully wound and the traverse guide crossed over into winding relation with the empty reel. In thus crossing the stock from each full reel to each empty reel, the same becomes anchored to stock holders or snaggers on the adjacent end discs of the reels, whereupon the crossover stock between the snaggers is severed. In thus anchoring the crossover stock to the snaggers on the reels and then severing it, the winding of each empty reel may proceed without any interruption in the winding operation, and both, leading and trailing, lengths of the stock on each fully wound reel are also exposed and, hence, immediately available for certain standard tests of the wound stock, especially if the stock is insulated conductor wire.

Among the snaggers used in winding apparatus of this type are those having on their periphery spaced elements which catch crossover stock in their path and anchor the same by wedging it to the snaggers. These latter snaggers, hereinafter referred to as wedge-type snaggers, require that the traverse or stock guide crosses from each full reel to the adjacent empty reel at very high speed in order that the crossover stock will be anchored to the snaggers on both reels inside a single revolution of both snaggers from the time the snagger on the full reel catches the crossover stock. Obviously, if the stock guide crossover would not meet this requirement, the crossover stock would dangerously whip around with the snagger on the full reel while the snagger on the empty reel is still out of reach of the crossover stock, with the result that the latter would either snap apart or become hopelessly entangled in the apparatus. In endeavoring to achieve ever faster crossover speeds of the stock guide as dictated by demands for ever increasing winding speeds of apparatus of this type, recourse has even been had to shooting the stock guide from each full reel across to the adjacent empty reel, as by pneumatic devices, for example. However, aside from the fact that a very fast crossover of the stock guide complicates its drive and inevitably poses an inertia problem for the guide and for the usual stock accumulator and also subjects the already tensioned crossover stock to sudden further and excessive tensile stresses, even the fastest possible crossover of the stock guide achieved to this day by shooting the same across, as aforementioned, limits the maximum winding speed of apparatus of this type considerably below that demanded even now by various industries, and especially the electrical wire industry.

It is the primary aim and object of the present invention to provide in winding apparatus of this type for holding the crossover stock out of reach of both snaggers and also out of following traction with the adjacent end disc or flange of the reel from which it crosses over, at least until the stock guide has crossed over a distance at which the stock therefrom would otherwise be within reach of the snagger on the full reel and be deflected by this snagger within reach of the snagger on the empty reel assuredly during much less than one revolution of the snagger on the full reel from its momentary angular position in which it catches the crossover stock, and then shifting the crossed-over stock within reach of the snagger on at least the full reel so that the stock will become anchored to both snaggers almost simultaneously. In doing so, the crossover stock is brought from reach by the snagger on the full reel within reach of the snagger on the empty reel incomparably faster than is possible by the crossover of the stock guide alone and regardless of the crossover speed of the latter, yet the stock guide may cross from one reel to the next reel advantageously at moderate speed, wherefore the present mode of bringing the crossover stock within reach of the snaggers not only overcomes the aforementioned and other difficulties of the hitherto conventional practice of relying on a fast crossover of the stock guide to the same end, but also permits winding speeds of the apparatus far in excess of those heretofore possible with wedge-type snaggers.

It is another object of the present invention to provide in winding apparatus of this type for diversion of the normally tensioned crossing-over stock along a path on which it is out of reach of both snaggers and also out of following traction with the adjacent end disc of the reel from which it crosses over, and for its release from this path when the stock guide has crossed-over sufficiently to assure that the stock-under-tension thus released will self-deflect within reach of the snagger on at least the full reel and be deflected thereby within reach of the snagger on the empty reel during much less than one revolution of both snaggers, thereby achieving the aforementioned shift of the crossover stock toward the snaggers by the tension in the stock itself and without any provisions in the apparatus other than those for diverting the crossover stock and releasing it for self-deflection toward the snaggers.

It is a further object of the present invention to provide a winding apparatus of this type for the aforementioned diversion of the crossing-over stock by arranging in its path a diverting track over which it will be led by the crossing-over stock guide, and from which it will be released preferably by stripping one from the other, so that the released stock will by its own action whip, as though shot from a bow, within reach of the snaggers on both reels or at least within reach of the snagger on the full reel, thereby achieving secure anchorage of the crossover stock to the snaggers on both reels during considerably less than one revolution of both snaggers with the greatest assurance regardless of the winding speed of the apparatus.

Another object of the present invention is to divide the aforementioned stock-diverting track in winding apparatus of this type into two separate end sections of which each section is also in winding relation with a stock wind-on rim on each wedge-type snagger between the latter and the respective reel, and both sections serve as a single track during at least part of the crossover of the stock, with the crossover stock being releasable from either track section independently from the other track section, thereby not only securing all the important advantages of the present mode of bringing the crossover stock within reach of both snaggers, but also permitting for the first time the winding on wedge-type snaggers of leading end lengths of the wound stock in each reel during a continuous winding operation of the apparatus. In thus providing also for the wind of crossover stock of any desired length on the snagger on each empty reel before proceeding with the winding of the stock on the reel itself, the exposed leading length of the stock on each full reel is no longer limited to the short and often inadequate exposed leading stock length obtained with wedge-type snaggers heretofore.

A further object of the present invention is to provide in winding apparatus of this type a fixed bearing for the support of the adjacent free ends of cantilever-like reel spindles on conventional reel stands which are tiltable into reel-winding and reel-exchange positions, and more particularly to provide a fixed bearing which is and remains open for free passage thereinto and therefrom of the free spindle ends on tilting the respective reel stands into and from their winding positions, yet supports these spindle ends so as effectively to suppress all bending tendencies of the spindles during a winding operation of the apparatus, including the relatively severe bending tendencies induced by the sudden anchorage of the cross-over stock to wedge-type snaggers on the reels.

Other objects and advantages will appear to those skilled in the art from the following, considered in conjunction with the accompanying drawings.

In the accompanying drawings, in which certain modes of carrying out the present invention are shown for illustrative purposes—

Figs. 1A and 1B are complementary parts of a front view, partly in section, of reel-winding apparatus embodying the present invention;

Fig. 2 is a side view of the reel-winding apparatus;

Fig. 3 is a cross section through the reel-winding apparatus taken substantially on the line 3—3 of Fig. 1B;

Fig. 4 is an enlarged fragmentary view of a certain operating device of the reel-winding apparatus;

Figs. 5, 6 and 7 are fragmentary sections taken on the lines 5—5, 6—6 and 7—7, respectively, of Fig. 4;

Fig. 8 is a diagrammatic view, in section, of certain control mechanism of the reel-winding apparatus;

Fig. 9 is a wiring diagram of the major operating controls of the reel-winding apparatus;

Fig. 9A is a diagrammatic view of a certain control device of the apparatus;

Fig. 10 is a fragmentary cross section through reel-winding apparatus embodying the present invention in a modified manner;

Fig. 11 is a fragmentary front view, partly in section, of the modified reel-winding apparatus as seen in the direction of the arrow 11 in Fig. 10;

Fig. 12 is a fragmentary cross section through reel-winding apparatus embodying the present invention in another modified manner;

Fig. 13 is a fragmentary front view of the modified reel-winding apparatus of Fig. 12;

Fig. 14 is a fragmentary front view of reel-winding apparatus embodying the present invention in a further modified manner;

Fig. 15 is a fragmentary side view of certain operating mechanism of the modified reel-winding apparatus of Fig. 14 as seen in the direction of the arrow 15 in Fig. 14;

Fig. 16 is a wiring diagram of a prominent part of the operating controls of the modified reel-winding apparatus of Figs. 14 and 15;

Fig. 17 is a fragmentary front view of reel-winding apparatus embodying the present invention in another modified manner;

Fig. 18 is a fragmentary section through certain operating mechanism of the modified reel-winding apparatus of Fig. 17, as taken on the line 18—18 of Fig. 17; and Fig. 19 is a fragmentary section taken on the line 19—19 of Fig. 18.

Referring to the drawings, and more particularly to Figs. 1A, 1B, 2 and 3, there is shown a winding apparatus 20 of a dual-reel type which comprises a main frame 22 that carries various operating mechanisms and devices. The main frame 22 is presently of the articulated type, having opposite end brackets or castings 24, 26 and a number of frame or tie bars which extend between and are secured to the end or frame brackets 24 and 26. In the present instance, there are provided a pair of bottom frame bars 28 and 30, a pair of rear frame bars 32 and 34, and a pair of top frame bars 36 and 38, which are presently bolted to the frame brackets 24 and 26 as at 40, 42 and 44, respectively.

Among the various operating mechanisms and devices of the winding apparatus are reel stands 46 and operating devices 48 therefor, reel units 50, reel drives 52, a stock guide 54, guide operating mechanism 56, a stock accumulator 58, a stock diverter 60, and operating controls.

Reel stands and their operating devices

The reel stands 46 are adapted removably to support reel units 50 for winding continuous stock s thereon. Both reel stands 46 are identical in their construction, except that they are of left and right hand design (Figs. 1A and 1B), wherefore they are hereinafter sometimes distinguished as left and right reel stands 46A and 46B. Each reel stand 46 is pivoted to a base 62 in the main frame 22 so as to be swingable upwardly into a reel-winding position, as shown, and downwardly into a reel-exchange position (not shown). Each base 62 is supported on the bottom frame bars 28, 30 and is provided with spaced upright arms 66 to which spaced bottom legs 68 of the associated stand are pivoted as at 70. Journalled in suitable antifriction bearings 72 and 74 in the top of each stand 46 is a shaft 76 (Fig. 1B) to which is splined the inner end 78 of a cantilever-type reel spindle 80, the spindle end 78 being held in the shaft 76 by a bolt 82. Seated on and turnable with a tapered length 84 of the reel spindle 80 is a coupling arm 86 having the usual pins 88 for its releasable driving connection with a reel unit 50.

The operating devices 48 for the left and right reel stands 46A and 46B are identical in every respect, and each comprises a fluid-pressure operated, and preferably air-pressure operated, cylinder 90 and a piston therein of which the rod 92 of the latter is pivotally connected at 94 with the associated reel stand 46 near its top. More particularly, the piston rod 92 receives the pivot pin 94 which extends with its ends into a forked lug 98 on the associated reel stand. Each cylinder 90 is presently clamped, preferably near its center of gravity, to a collar 100 having opposite trunnions 102 and 104 journalled in end plates 106 and 108 which are adjustably mounted at 110 on the opposite sides of a mounting bracket 112 that spans and is supported on the rear frame bars 32 and 34. Each cylinder 90, being presently of the double-acting type, is at its front and rear ends 114 and 116 in communication with a control valve (not shown). This valve, which may be entirely conventional and arranged within ready reach of an operator near the associated reel stand, may be manipulated to admit compressed air into either cylinder end 114 or 116 and simultaneously vent the other cylinder end. Thus, on admitting compressed air into the cylinder end 114 and simultaneously venting the opposite cylinder end 116, the associated reel stand will be swung into its aforementioned winding position. Conversely, on admitting compressed air into the cylinder end 116 and venting the other cylinder end 114, the associated reel stand will be swung into its reel-exchange position. When in its reel-winding position, each reel stand 46 is with its forked lug 98 drawn by the piston rod 92 firmly against the adjacent end of a sleeve 118 which bears against the front end of the associated cylinder 90, so that the top of the reel stand is, in its winding position, solidly backed against the main frame 22 through intermediation of the sleeve 118 and cylinder 90, with the result that any vibrational forces of the stand are transmitted to the main frame and more or less suppressed by the latter.

Cooperating with both reel stands 46, and more particularly with their cantilever-type reel spindles 80, is a fixed bearing 120 on an upright arm 122 of a bracket 124 which is with its base 126 received on the bottom frame bars 28, 30 and bolted thereto as at 128 (see also Fig. 3). The bearing 120 (Figs. 1B and 3) is presently in two parts which are formed as semiannular seats 130 in bearing plates 132, respectively, which are bolted to the opposite sides of the bracket arm 122, the latter being suitably recessed at 134 for clearance purposes which will become obvious hereinafter. The bearing seats 130 are adapted to support the free ends of the cantilever spindles 80 on the reel stands 46, respectively, and more particularly the outer races 136 of antifriction bearings 138 of the reel units 50 on these spindles. The bearing plates 130 and 132 are further slotted at 140 to their respective seats 130 to admit the antifriction bearings 138 on the adjacent spindle ends into and from seating engagement therewith on swinging the respective reel stands into and from their winding positions, as will be readily understood.

*Reel units*

The reel units 50 are identical in every respect, and each comprises a conventional reel 142 and a snagger device 144 which is releasably assembled with the latter. Each reel 142 comprises a wind-on rim 146 and opposite end discs or flanges 148 with a connecting hub or sleeve 150 by which the reel is rotatably supported on the spindle 80 of a reel stand 46. Both end flanges 148 of each reel are provided with holes 152 of which those in the end flange next to the associated stand 46 receive the pins 88 on the arm 86 on the spindle 80 for releasably coupling the reel with the latter. Each snagger device 144 comprises a web 154 which is riveted at 156 to a hub 158 that is slidably received on the reduced end 160 of the associated spindle 80 (Fig. 1B) and removably retained thereon by a swing washer 162 which is turnable on a stud 164 on the hub into and from interlock with an integral end collar 166 on the reduced spindle end 160. To this end, each swing washer 162 has a clearance slot 168 concentric with its swing axis on the stud 164 (Fig. 3). The web 154 of each snagger device 144 may have the exemplary multi-arm outline shown in Fig. 3, and is provided on each of its arms 170 with a snagger element 172 which serves to wedge, and thereby anchor, crossing stock in its path to the periphery of the arm. To this end, each snagger element 172 comprises a finger 174 which extends forwardly in the normal drive direction of the snagger device indicated by the arrow 176 in Fig. 3, and has an inwardly and rearwardly inclined edge 178 which cams crossing stock in its path onto a continuing rearward edge 180 that forms with the adjacent periphery 182 of the arm 170 a wedge-shaped notch 184 (Figs. 4 and 7) and leads the crossing stock thereinto for its wedged-on anchorage. In the present instance, each snagger element 172 is provided with a shank 186 which is fittedly received in a peripheral groove 188 in the arm 170 and secured to the latter by being bolted at 190 to an offset portion 192 thereof into which the groove 188 extends (Figs. 4 and 5). The edges of each arm 170 and snagger element 172 thereon which will be engaged by the stock are preferably sufficiently rounded, as at 194 in Figs. 6 and 7, to prevent severance of the stock thereat. The web 154 of each snagger device 144 is also provided with coupling pins 196 (Fig. 1B) which are received in the holes 152 in the adjacent end flange 148 of the associated reel.

It follows from the preceding that the parts 138, 154, 158, 162 and 172 of each snagger device 144 form a self-contained unit separate and apart from any reel 142 with which it may be associated to constitute a reel unit 50. Assuming now that the reel 142 of the reel unit 50B on the right stand 46B (Fig. 1B) were fully wound with stock and that it is time to exchange this full reel for an empty reel, the operator merely manipulates the aforementioned valve for causing the operating device 48 for the reel stand 46B to swing the latter into its reel-exchange position in which the end flanges 148 of the reel come to rest on a support, preferably a wheeled support, which is sufficiently above the ground to keep the snagger elements 172 clear of the latter. In thus swinging the reel stand 46B into its reel-exchange position, the antifriction bearing 138 of the snagger device or unit 144 thereon is swung clear of the fixed bearing 120, so that only the locked swing washer 162 is in the way of sliding the snagger unit and the associated reel from the spindle 80 of the stand 46B. Hence, as soon as the reel stand 46B reaches its reel-exchange position, the swing washer 162 is turned out of interlock with the spindle 80, whereupon the snagger unit 144 and the full reel 142 thereon may be removed therefrom. An empty reel is then slid over the spindle 80 into coupled relation with the pins 88 on the arm 86, and the snagger unit 144 is slid over the end of the spindle and coupled with the adjacent end flange of the reel, whereupon the swing washer 162 is turned into interlock with the spindle. The reel stand 46B is then returned to its winding position ready for the subsequent wind of stock on the empty reel thereon.

*Reel drives*

The individual drives 52 for the reel units 50 on the left and right stands 46A and 46B are also identical in every respect. Thus, each reel drive 52 has for its prime mover an electric motor 200, preferably of a speed-adjustable type, which is suitably mounted on the base 62 of the associated reel stand 46 and the output shaft 202 of which is coupled at 204 to the input shaft 206 of a right-angle gearing 208 (Figs. 1B and 2) in a box 210 that is mounted on the same base 62. The right-angle gearing 208 presently comprises a pair of meshing bevel gears 212 and 214 of which the gear 212 is carried by the input shaft 206 and the other gear 214 is carried by a stub shaft 216 which is journalled in the box 210. The shaft 216 carries a multi-groove pulley 218 which through V-belts 220 is drivingly connected with a similar pulley 222 on the spindle shaft 76 in the stand 46. The belts 220 are preferably led over a tensioner roll 224 on an arm 226 which is pivoted at 228 to the respective stand 46 (Figs. 2 and 3) and carries a pivoted link 230 that extends through a boss 232 on the stand and receives a nut 234 for holding and adjusting the tension in the belts. Thus, on rendering either reel drive 52 operative, the reel spindle 80 on the associated stand 46 is driven, and the reel unit 50 thereon is also driven by virtue of the releasable coupling of its parts 142 and 144 to the reel spindle.

Each base 62, which carries a reel stand 46 and the associated reel drive 52, is presently axially slidable on the bottom frame bars 28 and 30, and the associated stand-operating device 48 is also axially slidable on the rear frame bars 32 and 34. Accordingly, each reel stand, its reel drive and its operating device, may be adjusted for winding stock on reels of different widths, by simply sliding the corresponding base 62 and the associated stand-operating device 48 on the bottom and rear frame bars, respectively, and using interchangeable reel spindles 80 of the correct lengths. For the adjustment of each base 62, and presently for simultaneous and equal adjustments of both bases 62, the latter threadedly receive spindles 221 which extend into an open recess 223 in the fixed base 126 of the center bracket 124 and are there pinned at 225 to a sleeve 227 which holds the spindles 221 against axial movement. The sleeve 227 is preferably hexagonal and accessible from the top of the bracket base 126 with a suitable wrench to be turned thereby for adjustment of the bases 62.

Stock guide

The stock guide 54 is adapted to lead stock $s$ from the accumulator 58 to be described in successive layers of orderly turns onto each of the reels on the stands 46A and 46B, and also shift or cross the stock from wind-on relation with either reel, when fully wound, over into wind-on relation with the other reel, to the end of uninterruptedly winding stock onto successive empty reels on their replacement for fully wound reels on the stands. To this end, the stock guide 54 is axially movably supported on the foremost top frame bar 36 so that it may move thereon back and forth within the widthwise confines of either reel on the stands and lead stock thereonto, and may also move in either direction across the gap between the adjacent reels in order to cross the stock from either reel over to the other reel. More particularly, the guide 54 comprises spaced rollers 236, preferably of the antifriction type, between which the stock $s$ passes and which are carried on and extend forwardly from a carrier 238 that is vertically adjustable on a bracket 240 which is slidable on the frame bar 36 (Figs. 1B and 2). The center of gravity of the guide 54 is presently forwardly of the frame bar 36 on which it is slidable. To prevent the guide from tilting downwardly on the frame bar 36, the guide bracket 240 is in back thereof provided with one or more rolls 242 which bear against the other top frame bar 38. The rolls 242 also transmit to the frame bar 38 any and all downward thrusts imparted to the guide by the stock $s$ on its forced draw between the guide rollers 236 onto a driven reel. In order that the frame bar 38 may also take up any accidental upward thrusts on the guide rollers 236, the former is near its top engaged by, or in near engagement with, an adjustable set screw 244 on the guide bracket 240. The frame bar 38 will thus effectively counteract all turning tendencies of the guide from any cause whatever and, in consequence, avoid any harmful bending stresses in the operating spindle 250 to be described with which the guide is threadedly engaged for deriving its operating motions therefrom.

Guide-operating mechanism

As already mentioned, the stock guide 54 is adapted to lead stock $s$ in successive layers of orderly turns onto each of the reels on the stands, and also shift or cross the stock from wind-on relation with either reel over into wind-on relation with the other reel. For each of these operations, the stock guide 54 derives its motion from the operating spindle 250 which is threaded throughout and, as already mentioned, in threaded engagement with the guide bracket 240. The spindle 250 is journalled in spaced brackets 252 and 254, presently through intermediation of antifriction bearings 256 and 258 (Figs. 1A and 1B). The brackets 252 and 254 are suspended from the foremost top frame bar 36 and bolted to flats on the other top frame bar 38 as at 260 and 262, respectively (see also Figs. 2 and 3).

Since the stock guide 54 will move much slower for a reel-winding operation than for crossover of the stock from either reel to the other reel, it stands to reason that the guide-operating spindle 250 will have to be driven at different speeds for these purposes. To this end, the operating spindle 250 has a slow or "lay-traverse" drive for stock wind-on performances of the guide, and a fast or "quick-shift" drive for stock crossover performances of the guide. In the present instance, these lay-traverse and quick-shift spindle drives are separate drives.

The lay-traverse drive originates at a prime mover 264, presently an electric motor, which is mounted on a platform 266 that is bolted at 268 to the inside of the frame end bracket 26 (Figs. 1B and 2). The motor 264 is provided with a reduction gearing 270, the output shaft 272 of which carries a sprocket 274 that is drivingly connected by a chain 276 with a sprocket 278 on a shaft 280 which is suitably journalled in a casing 282. The casing 282, which is generally of open rectangular shape, is bolted at 284 to the inside of the frame end bracket 26. The shaft 280 in the casing 282, which is the input shaft therein, also carries a pulley element 286 of a variable-speed drive unit 288 which further includes another pulley element 290 on a shaft 292 and a connecting belt 294. The shaft 292 is also journalled in the casing 282, and more particularly in the left end wall 296 and in an adjacent intermediate bearing lug 298 thereof (Fig. 1B). The pulley elements 286 and 290, which are identical and of well-known type, have inwardly tapered cheeks 300 and 302 which are axially adjustable toward and away from their axially immovable companion cheeks 304 and 306 (Fig. 1B) which are also inwardly tapered. The cheeks 300 and 302 of the respective pulley elements 286 and 290 have extensions 308 and 310 which are floatingly pivotally connected at 312 and 314, respectively, with a shifter bar 316 on opposite sides of and at equal distances from its pivot mount 318 on a post 320 on the sidewall 296 of the casing 282. The upper end of the shifter bar 316 carries a floatingly swivelled nut 322 which receives the threaded end of an adjustment spindle 324 that is held against axial movement on the frame end bracket 26 and provided on the outside thereof with a handle 326 for manipulation. Thus, on turning the spindle 324 at its handle 326, the speed ratio of the pulley elements 286 and 290 will be increased or decreased, depending on the direction of rotation of the spindle 324, as will be readily understood.

Carried by the shaft 292, which also carries the pulley element 290 of the variable-speed drive unit 288, is a gear 328 which is in mesh with an identical gear 330 on a shaft 332, journalled in the left sidewall 296 and an adjacent intermediate bearing lug 334 of the casing 282. The shafts 292 and 332 also carry members 336 and 338 of conventional magnetic clutches 340 and 342, respectively, the companion members 344 and 346 of which are carried by shafts 348 and 350, respectively, which are journalled in the right sidewall 352 and adjacent intermediate bearing lugs 354 and 356 of the casing 282 (Fig. 1B). Further carried by the shafts 348 and 350 are identical sprockets 358 and 360, respectively, both of which are drivingly connected, by a single chain 362, with a sprocket 364 on an extension 366 of the guide-operating spindle 250 (Figs. 1B and 2). The chain 362 presently passes also over a sprocket 368 on the output shaft of a quick-shift motor 370 to be described. However, and as will be explained more fully hereinafter, the sprocket 368 and the quick-shift motor 370 will merely idle on operation of the lay-traverse spindle drive and, hence, form no part of the latter.

Controls to be described are operative during each reel-winding operation to reverse the lay-traverse drive of the operating spindle 250 whenever stock led by the guide onto a reel in side-by-side turns thereon reaches the opposite end flanges of the reel so that the stock-winding operation may continue uninterruptedly and in orderly fashion until the reel is full. The controls referred to achieve this by alternately energizing the usual exciting coils of the normally disengaged magnetic clutches 340 and 342 in order to cause their engagement. Let it now be assumed that the guide 54, in leading stock onto the reel 142 on the stand 46B has just reached the right-hand limit of its back and forth travel at which the stock is adjacent the right end flange 148 of the reel (Fig. 1B), the controls will then act to reverse the lay-traverse drive of the operating spindle 250 in order to cause motion of the stock guide 54 toward the opposite or left reel end flange 148, which requires counterclockwise driving of the operating spindle 250 as viewed in Fig. 2. Under these circumstances, and assuming that the input shaft 280 in the casing 282 is driven clockwise (Fig. 2) from the lay-traverse motor 264, the required counterclockwise drive of the operating spindle 250 is achieved on action of the control means to cause engagement of the magnetic clutch 342. When the clutch 342 is thus engaged, while the other magnetic clutch 340 is disengaged, the clockwise drive of the input shaft 280 (Fig. 2) is imparted through the variable-speed drive unit 288 to the shaft 292 (Fig. 1B) in the same direction, and from there to the chain drive 358, 360, 362 and 364 in the opposite direction, however, since the drive of the latter is by way of the direction reversing gear 330 and the then engaged magnetic clutch 342, the other magnetic clutch 340 being then disengaged, as described, wherefore the associated sprocket 358 acts as a mere idler in the chain drive to the operating spindle 250. Conversely, when the stock guide 54, on its travel to the left in Fig. 1B, reaches its other limit at which the stock led therefrom is adjacent the left end flange 148 of the same reel, the controls will cause disengagement of the magnetic clutch 342 and engagement of the magnetic clutch 340, resulting in the drive of the operating spindle 250 in the opposite or clockwise direction (Fig. 2) in which to cause movement of the stock guide in the opposite direction, i.e., to the right as viewed in Fig. 1B, as will be readily understood. The controls to be described thus continue to cause reversals of the lay-traverse spindle drive until the reel is fully wound, whereupon the quick-shift spindle drive to-be-described will function to cause movement of the guide 54 for quick crossover of the stock s from the reel on the stand 46B onto the adjacent reel on the stand 46A (Figs. 1A and 1B). The lay-traverse spindle drive will thereupon resume its designated function of causing movement of the guide back and forth widthwise of the reel on the stand 46A for leading stock thereonto in successive layers of orderly turns until this reel is fully wound. The quick-shift spindle drive will then again perform to cause movement of the stock guide, this time in the opposite direction, for quick crossover of the stock from the reel on the stand 46A onto an empty reel on the stand 46B which in the meantime has been exchanged for the previously wound reel thereon. The lay-traverse and quick-shift spindle drives thus perform alternately as long as continuous stock is to be wound uninterruptedly on successive reels on the stands 46.

The quick-shift drive of the operating spindle 250 comprises the aforementioned reversible quick-shift motor 370 and the aforementioned chain drive 358, 360, 362 and 364 which this time includes the sprocket 368 on the output shaft of the quick-shift motor. However, since both magnetic clutches 340 and 342 of the lay-traverse spindle drive are disengaged during operation of the quick-shift spindle drive as more fully explained hereinafter, the sprockets 358 and 360 of the above chain drive then act as mere idlers, wherefore the lay-traverse spindle drive is inoperative while the quick-shift spindle drive is operative, and vice versa. The quick-shift motor 370 is presently mounted in back of an upright bracket 372 which, in turn, is bolted at 374 to flats 376 on the top frame bars 36 and 38 (Figs. 1B and 2).

*Stock accumulator*

A stock accumulator is customarily resorted to in any stock-winding operation involving rate differentials of the stock advance into a winding apparatus at constant stock advance toward the latter, and requiring substantially constant stock tension during the winding operation. The present accumulator 58 thus serves to take in stock s at a constant rate which at times is different from the varying rate at which the winding apparatus draws stock therefrom, and to keep the stock under substantially constant tension.

The accumulator 58 comprises a fixed roll unit 380 and a dancer-roll unit 382 (Figs. 1A, 1B, 2 and 3). The fixed roll unit 380 is composed of a number of separate rolls or sheaves 384 which are individually turnable on a spindle 386 that extends forwardly from the aforementioned bracket 372. The dancer-roll unit 382 is also composed of a number of separate rolls or sheaves 388 which are individually turnable on a spindle 390 that extends forwardly from the long arm 392 of a bellcrank lever 394 which, as best shown in Figs. 1A and 3, is pivoted on a shaft 396 in a bracket 398 that is mounted at 400 on the inside of the frame end bracket 24. Pivotally connected at 402 with the short arm 404 of the bellcrank lever 394 is the rod 406 of a plunger in a cylinder 408, presently an air cylinder, which at 410 is pivotally mounted on a bracket 412 on the inside of the frame end bracket 24.

The accumulator 58 further comprises, in the present instance, a single shock roll or sheave 414 which is turnable on a stud 416 on one end of an arm 418 which is firmly mounted on one end of a turnable shaft 420 in an upward extension 422 of the aforementioned bracket 372. The other end of the shaft 420 carries an arm 424 to which is pivotally connected at 426 a clevis 428 on the rod 430 of a plunger in a cylinder 432, presently an air cylinder, which at 434 is pivotally mounted on the bracket 372.

The stock s to-be-wound in the present apparatus may, for example, be continuous insulated conductive wire or cable which by a power-driven capstan is drawn through a side-delivery head of an insulation extruder, and also through an immediately following vulcanizer if the insulation is rubber, and the stock is paid-out by the capstan to the accumulator at a constant rate. In the present instance, the stock s paid-out by the capstan approaches the winding apparatus from the right of the fixed roll unit 380 (Fig. 1B) and passes over the rearmost roll 384a of the latter (Fig. 2), thence over to the dancer-roll unit 382 and over the rearmost roll 388a thereof, then back and forth between these roll units and over progressive forward rolls thereof until the stock passes over the foremost roll 384b and over the shock roll 414 to the stock guide 54, as shown in Figs. 1A and 1B.

The stock in the accumulator is kept under substantially constant tension by fluid-pressure exertion, and more particularly air-pressure exertion, on the dancer-roll unit 382 to the effect of urging the same away from the fixed roll unit 380. To this end, compressed air is, under the control of a conventional settable pressure-regulatable bleeder-type valve (not shown) admitted to the upper end of the cylinder 408 (Fig. 1A), while the lower end of the cylinder is permanently vented. Hence, the plunger (not shown) in this cylinder is constantly urged downwardly, with the result that the bellcrank lever 394 is constantly urged in counterclockwise direction (Fig. 1A) in which it carries the dancer-roll unit 382 away from the fixed roll unit 380. The beforementioned regulatable bleeder-type valve functions to maintain the air pressure in the cylinder 408 at any preset value, the valve bleeding air from the cylinder when the accumulator pays out more stock than it receives per time unit and the dancer-roll unit 382 moves, in consequence, to the right as viewed in Fig. 1A, and admitting air at the preset pressure into the cylinder when the accumulator stores up stock and the dancer-roll unit 382 moves, in consequence, to the left as viewed in Fig. 1A.

Acting on the bellcrank lever 394 is a counterbalance spring 436 which is anchored with its ends to the short arm 404 of the latter and to a stud 438 on the frame end bracket 24. This spring 436 is calibrated and arranged so as substantially to counterbalance the gravitational forces of the bellcrank lever 394 and the dancer-roll unit 382 thereon in any angular position of the lever.

The shock roll 414 serves to respond quickly to operational stock surges and hesitations in a continuous winding performance of the apparatus. In the absence of this shock roll 414, the dancer-roll unit 382, by virtue of its own inertia and that of the bellcrank lever 394, might at times fail to respond to sudden stock surges or hesitations with sufficient rapidity to avoid excessive tension in, or even breaking of, the stock, or running of the stock off one or more rolls of the roll units 380 and 382. Compressed air is, under the control of another conventional settable pressure-regulatable bleeder-type valve (not shown), admitted to the lower end of the cylinder 432 (Fig. 1B), while the upper end of the cylinder is permanently vented. Hence, the plunger (not shown) in this cylinder is constantly urged upwardly, with the result that the shock-roll arm 418 is constantly urged into its uppermost position. The valve functions to maintain the air pressure in the cylinder 432 at the preset value, the valve bleeding air from the cylinder when the shock-roll arm 418 responds to an increase in the stock tension, and admitting air at the preset pressure into the cylinder when the shock-roll arm responds to a decrease in the stock tension. In order that the shock roll 414 may perform properly, the pivot connection 426 between the plunger rod 430 and the arm 424 is very close to the rotary axis of the latter and of the shock-roll arm 418, wherefore the stock forces acting on the shock roll have a very large leverage in comparison to that of the plunger force acting on the arm 424 and opposing downward pull of the shock-roll arm 418. Accordingly, the shock roll 414 may immediately respond to even quite sudden and considerable stock pulls thereon by swinging downwardly through a considerable arc, for the valve will be well able instantly to bleed-off the small amount of air displaced from the cylinder in consequence.

Stock diverter

In operating the stock guide 54 to cross the stock s from either reel over to the other reel, the crossover stock must be anchored to the snagger devices 144 on both reels before being severed, so that, after severance of the crossover stock, the trailing stock length on the full reel will not be free to act as a potentially hazardous whirling snag and, more importantly, the leading length of the stock to be wound onto the empty reel will turn with the latter which is imperative for a stock-winding start on the empty reel. It is further imperative that the crossover stock becomes anchored to the snagger devices on both reels almost simultaneously, and in any event within less than one revolution of the full reel from its momentary angular position in which the stock becomes anchored to the snagger device thereon, for the crossover stock would otherwise repeatedly whip around with the snagger device on the full reel while still out of reach of the snagger device on the empty reel and, in consequence, might well snap apart or become hopelessly entangled in the apparatus, not to mention likely jumping of the stock from the accumulator. Since for the foregoing reason alone the crossover stock must be anchored to the snagger devices on both reels within less than one revolution of the full reel, it is, of course, perfectly feasible to provide for severance of the crossover stock advantageously by means of a fixed knife which projects between the reels. Thus, there is mounted at 440 on the upright arm 122 of the center bracket 124 a knife 442 which, as shown in Figs. 1B and 3, is in the path of stock crossed from either reel over to the other reel.

For the aforementioned imperative nearly-simultaneous anchorage of the crossover stock to the snagger devices on both reels, the stock guide 54 must cross the stock at least beyond the snagger device on the empty reel before the crossover stock can be admitted within reach of the snagger device on the full reel, for the crossover stock would otherwise never be deflected by the latter snagger device into reach by the snagger device on the empty reel within one revolution of the full reel from its momentary angular position in which the stock becomes anchored to the snagger device thereon. On the other hand, unless the stock guide is crossed from wind-on relation with the full reel over into wind-on relation with the empty reel at exceptionally high speed, and is in fact shot from wind-on relation with the full reel over into wind-on relation with the empty reel in a winding performance of even moderately high speed, the crossover stock will, by the snagger device on the full reel or by following traction with the adjacent end flange of the full reel, be taken around with the latter long before it has crossed beyond the snagger device on the empty reel and, in consequence be repeatedly whipped around with the full reel before coming within reach of the snagger device on the empty reel.

It is to assure almost simultaneous anchorage of the crossover stock to the snagger devices on both reels without regard to the crossover speed of the stock guide, that the stock diverter 60 has been provided (Figs. 1B and 3). Underlying this stock diverter is a method of controlling the crossover stock between the reels, which comprises diverting the crossing-over stock from the paths of the snagger devices on both reels at least until the stock guide has crossed the stock beyond both adjacent reel ends a sufficient distance at which the stock would, if not thus diverted, be in the path of the snagger device on at least the full reel and deflected thereby into the path of the snagger device on the empty reel, and then shifting the crossover stock into a non-diverted course between the stock guide and the full reel from which it crosses over. A preferred aspect of this underlying method is to release the diverted crossover stock for whip-like self-deflection into a non-diverted course between the stock guide and the full reel from which it crosses over.

The stock diverter 60 comprises, in the present instance, a stock-diverting track 450 which substantially bridges the adjacent ends of both reels, presently the adjacent end flanges 148 thereof. The track 450 is, in this instance, formed by opposite end sections 452 (Fig. 1B) which are presently of part-tubular shape and suitably carried by blocks 454 which are mounted for adjustment toward and away from each other on the head plate 456 of a slide 458 by means of bolts 460 which extend through elongated slots 462 in the head plate 456. The slide 458 is guided for rectilinear movement in a bracket 464 which is pivoted at 466 to a fixed upright arm 468 on the rear frame bar 34, the former being to this end pinned to the latter at 470. The bracket 464 is held in forwardly projected position on the arm 468 by means of a link 472 which at its ends is bolted at 474 and 476 to the forward end of the bracket 464 and to a side lug 478 on the arm 468, respectively.

Operatively connected at 480 with the head plate 456 of the slide 458 is the rod 482 of a plunger 484 in an air cylinder 486 (Figs. 3 and 8) which is mounted at 488 on top of the bracket 464. The cylinder 486 and plunger 484 therein serve to move the track 450 into the full-line projected or operative position and into the dot-and-dash-line retracted or inoperative position shown in Fig. 3. To this end, the cylinder 486 is of the double-acting type, having its front and rear ends 490 and 492 connected through conduits 494 and 496, respectively, with the chamber 498 in the casing 500 of a suitable valve 502 (Fig. 8). The valve chamber 498 is through a conduit 504 connected with a suitable source of compressed air, and is at its opposite ends provided with vents 506 and 508. Slidable in the valve chamber 498 is a valve element 510. Thus, on shifting the valve element 510 into the full-line position in Fig. 8, compressed air is admitted to the rear end 492 of the cylinder 486 and the front end 490 thereof is vented, with the result that the plunger 484 is shifted to and held in its full-line position in which the track 450 is in its full-line projected position in Fig. 3. Conversely, on shifting the valve element 510 into the dot-and-dash-line position in Fig. 8, compressed air is admitted to the front end 490 of the cylinder 486 and the rear end 492 thereof is vented, with the result that the plunger 484 is shifted to and held in its dot-and-dash-line position in which the track 450 is in its dot-and-dash-line retracted position in Fig. 3. A spring 512 in the valve chamber 498 normally urges the valve element 510 into the dot-and-dash-line position (Fig. 8) in which the track 450 is held in its dot-and-dash-line retracted position (Fig. 3).

Substantially at the start of the crossover of the stock $s$ by the guide 54 from either reel over to the other reel, presently from the full reel on the left stand 46A over to the empty reel on the right stand 46B (Figs. 1A and 1B), a relay 514 (Fig. 8) is energized, in a manner described hereinafter, to move the valve element 510 against the urgency of the spring 512 into the full-line position in Fig. 8, thereby causing movement of the track 450 into the full-line projected position in Fig. 3 in which the same is in the path of the crossing-over stock and diverts the same from the paths of the snagger elements 172 on the snagger devices 144 on both reels (Fig. 1B). Moreover, the end sections 452 of the track 450 are so adjusted on the head plate 456 of the slide 458 that either track section diverts the crossing-over stock from following traction with the adjacent end flange 148 of the reel from which the stock crosses, presently the adjacent end flange 148 of the full reel on the left stand 46A (Figs. 1A and 1B). The crossing-over stock will thus pass over the track 450 opposite to its crossover direction and be wound on the full reel until the stock guide 54 has crossed the stock at least beyond the adjacent end flanges 148 of both reels, and in fact sufficiently therebeyond, as shown in Fig. 1B, for example, that the crossover stock will, on its release from the track, be deflected into the path of the nearest snagger element 172a on at least the full reel approximately at the station A in Fig. 3, and be further deflected by the engaging snagger element 172a into the path of the snagger elements on the empty reel before the engaging snagger element 172a on the full reel reaches in its counterclockwise rotation with the latter the station B (Fig. 3) at which the snagger element 172a reverses from downward rotation to upward rotation with the full reel. Thus, it is on its brief passage between the stations A and B that the snagger element 172a on the full reel rams against the released crossover stock and deflects the same into the path of the snagger elements on the empty reel of which the nearest one will ram against and, hence, anchor the crossover stock, the empty reel being to this end driven at this stage at greater speed than the full reel.

For the release of the crossover stock from its deflected state on the projected track 450, the relay 514 (Fig. 8) is deenergized in a manner described hereinafter, with the result that the valve element 510 is spring-shifted into its dot-and-dash-line position to cause retraction of the track 450 into its dot-and-dash-line position (Fig. 3) in which the same clears the crossover stock. It is during such retraction of the track 450 that the same suddenly moves from beneath the tensioned crossover stock and, hence, releases the same for advantageous whip-like self-deflection into the path of the snagger elements on at least the full reel, as will be readily understood.

It may well be that, due to the aforementioned differential drives of the reels at the time of the crossover of the stock and its release from the track 450, the length of the crossover stock between the snagger devices on both reels to which it is anchored will snap apart of its own accord due to excessive tension, with the severed stock ends remaining anchored to the respective snagger devices. However, if the released crossover stock should not snap apart of its own accord, it will assuredly be severed on running against the fixed knife 442 on the upright arm 122 of the center bracket 124 (Fig. 3).

It follows from the preceding that the track 450 performs the important function of diverting the crossing-over stock from the paths of the snagger elements on both reels until the stock guide has crossed sufficiently so that the stock on its release therefrom will assuredly deflect into the path of the snagger elements on at least the full reel, if not on both reels, and if deflected into the path of the snagger elements on the full reel only, will be deflected by the engaging snagger element into the path of the snagger elements on the empty reel within even less than one-half revolution of the full reel from the station A at which the stock is caught by the first snagger element, regardless of the speed of the full reel. Accordingly, the crossover speed of the stock guide 54 from either reel to the other reel is of no consequence in achieving secure anchorage of the crossover stock to the snagger devices on both reels, and the stock guide may cross from either reel to the other reel at any speed best suited for an intended winding performance of the apparatus, but far below the excessive speed heretofore required in the absence of the present stock diverter 60.

The track 450 may also be adjusted higher or lower to permit its efficient performance when reels of different sizes, and more particularly of different flange diameters, are to be wound with stock. To this end, the link 472 is at its lower end provided with a series of holes 477 (Fig. 3) for selective reception of the bolt 476 by means of which the link is releasably secured to the side lug 478 on the upright arm 468. Thus, the track 450 may, on removal of the bolt 476 from the lug 478 on the arm 468, be swung into adjusted positions at different levels and locked in any adjusted position by passing the bolts 476 through the corresponding hole 477 in the link 472 and reapplying it to the lug 478 on the arm 468. Level adjustability of the track 450 in this fashion is particularly advantageous, since the same should be as close as possible to the adjacent end flanges of the reels so as to permit vertical or level adjustment of the guide roll carrier 238 on the guide bracket 240 into as close proximity to the reel end flanges as is permissible in view of the requirement that the guide rolls 236 clear the track 450 on passing the same (Figs. 1B and 3). Of course, the closer the rolls 236 of the stock guide 54 are adjusted to the adjacent end flanges of the reels, the smaller the distance the guide need cross beyond both adjacent reel end flanges before releasing the crossover stock from the diverting track 450 for its nearly simultaneous anchorage to the snagger devices on both reels.

*Operating controls*

The operating controls of the aforementioned slow or lay-traverse drive of the guide-operating spindle 250 include coils 520 and 522 (Fig. 9) which are the previously mentioned exciting coils of the conventional electromagnetic clutches 342 and 340, respectively (Fig. 1B). Thus, and as already explained hereinbefore, the coils 520 and 522 of the electromagnetic clutches 342 and 340 are energized for the lay-traverse drive of the stock guide exemplary to the left and right, respectively, in Figs. 1A and 1B. The controls for the alternate energization of these clutch coils 520 and 522 include a "lay-traverse" switch 524 which is mounted on the inside of the left frame end bracket 24 (Figs. 1A and 3) and has an operating arm 526 that is normally biased into the switch-opening position shown in Fig. 3, and also in full lines in Fig. 9, by a straddling arm 528 on a rock shaft 530, by means of which it is also shifted at times into switch-closing positions to both sides of its switch-opening position. The rock shaft 530 is with its ends journalled in suitable bearing brackets 532 and 534 on top of the left frame end bracket 24 and on the upright accumulator bracket 372 (Figs. 1A and 1B). The rock shaft 530 is substantially midway of its length further journalled in a bracket 536 which is bolted at 538 to a flat on the rear top frame bar 38 (Figs. 1B and 3). Carried by the rock shaft 530, presently angularly and axially adjustable thereon by means of set screws 540, are pairs of limit arms 542 and 544 which are associated with the left and right reel stands 46A and 46B, respectively (Figs. 1A and 1B). Cooperating with these limit arms 542 and 544 is a cam element 546 in the rear of a bracket 548 on top of the guide bracket 240 (Figs. 1B and 3). The element 546 has oppositely inclined cam faces 550 and 552 of which cam face 550 will, on motion of the stock guide 54 to the left (Figs. 1A and 1B), engage the ball-shaped ends of the left limit arms 542a and 544a and rock the latter and the rock shaft 530 counterclockwise as viewed in Fig. 3, with resulting clockwise rocking of the switch arm 526 into the corresponding switch-closing position. The other cam face 552 will, on motion of the stock guide 54 to the right (Figs. 1A and 1B), engage the ball-shaped ends of the right limit arms 542b and 544b and rock the latter and the rock shaft 530 clockwise as viewed in Fig. 3, with resulting counterclockwise rocking of the switch arm 526 into the corresponding switch-closing position. The limit arms 542 and 544 are normally biased into the position shown in Figs. 1A, 1B and 3, i.e., in the path of the respective cam faces 550 and 552 of the element 546, by means of a spring 554 which is anchored with its ends to an arm 556 on the rock shaft 530 and to a plate 558 on the spindle bracket 252 (Figs. 1A and 3).

Assuming now that the lay-traverse drive of the stock guide is operative, and that the stock guide 54 leads stock onto the reel on the right stand 46B and presently traverses to the left as viewed in Fig. 1B, the stock guide will continue its left traverse motion until the stock therefrom reaches the left end flange of the reel, at which time the cam face 550 of the element 546 on the guide engages the left limit arm 544a and rocks the same and the rock shaft 530 to cause rocking of the arm 526 of the lay-traverse switch 524 into the one switch-closing position, i.e., the dotted-line position 526b in Fig. 9, in which the coils 520 and 522 (Fig. 9) of the electromagnetic clutches 342 and 340 are deenergized and energized, respectively, in a manner to be described, for reversal of the lay-traverse drive of the stock guide 54 and motion of the latter to the right (Fig. 1B). The stock guide will continue its right traverse motion until the stock therefrom reaches the right end flange of the reel, at which time the other cam face 552 of the element 546 on the guide engages the right limit arm 544b and rocks the same and the rock shaft 530 to cause rocking of the switch arm 526 into the other switch-closing position, i.e., the dotted-line position 526a in Fig. 9, in which the same coils 520 and 522 of the clutches 342 and 340 are now energized and deenergized, respectively, also as described hereinafter, for another reversal of the lay-traverse drive of the stock guide and motion of the latter to the left again (Fig. 1B). The stock guide 54 thus reciprocates back and forth between the end flanges of the reel, under the control of the axially adjusted limit arms 544 on the rock shaft 530 until the reel is fully wound, whereupon the aforementioned quick-shift drive of the guide-operating spindle comes into play, in a manner also described hereinafter, to cross the guide from the full reel over to the empty reel which, in the present exemplary performance of the apparatus would be the reel on the left stand 46A. It is during this quick crossover of the stock that the stock diverter 60 performs its designated stock-diverting function, and it is at the end of the quick crossover of the stock guide that the crossover stock will be released from the diverter 60 and become anchored to the snagger devices on both reels and subsequently severed therebetween, whereupon the lay-traverse drive of the guide-operating spindle 250 resumes its operation, with the reversals of the drive being now under the control of the limit arms 542 on the rock shaft 530, as will be readily understood.

The clutch coils 520 and 522 are connected across an A.C. line 560 (Fig. 9) via a lead 562, a normally closed switch 564, a lead 566, a normally closed switch 568 and a lead 570 from which branch leads 572 and 574 in which the clutch coils 520 and 522, respectively, are interposed. Also interposed in the leads 572 and 574 are switches 576 and 578 which are ganged so that either switch will be open when the other switch is closed. The switches 576 and 578 are under the control of relays 580 and 582, respectively, which are connected across the A.C. line 560 by leads 584 and 586, respectively, the lay-traverse switch 524 and a lead 588. Thus, when the stock guide 54, in winding stock onto either reel, reaches its right end position (Figs. 1A and 1B), the arm 526 of the lay-traverse switch 524 will be shifted to its dotted-line position 526a (Fig. 9) in which relay 580 is energized and the ganged switches 576 and 578 shifted, in consequence, from their illustrated positions into closed and open positions, respectively, with the result that the clutch coil 520 is energized for reversal of the lay-traverse drive and motion of the stock guide 54 to the left. Conversely, when the stock guide 54 reaches its left end position, the arm 526 of the lay-traverse switch 524 will be shifted into its other dotted-line position 526b in which relay 582 is energized and the ganged switches 576 and 578 shifted, in consequence, into their illustrated positions, with the result that the other clutch coil 522 is energized for reversal of the lay-traverse drive and motion of the stock guide 54 to the right. Since the rock shaft 530 is normally biased into the position in Fig. 3 in which its arm 528 opens the lay-traverse switch 524, the latter will be opened shortly after each reversal of the stock guide 54 when the cam element 546 thereon moves away from the respective limit arm 542 or 544, with the result that the relays 580 and 582 will be energized only momentarily. However, in order to retain the switches 576 and 578 in their alternate positions to which they are shifted by the momentarily energized relays 580 and 582, these switches 576 and 578 are mechanically locked in their alternate positions, and are to this end provided with a member 590 having notches 592 and 594 with either one of which cooperates a spring-urged plunger 596 for releasably locking the switches 576 and 578 in the corresponding position. Thus, while the relays 580 and 582 are only momentarily energized alternately during a reel-winding operation, the switches 576 and 578 respond to each relay and remain locked in their respective positions until the other relay is momentarily energized.

The reversible quick-shift motor 370 of the quick-shift drive of the guide-operating spindle 250 has the usual starting winding 600 and running winding 602 (Fig. 9) which are under the control of right and left direction switch units 604 and 606, respectively. Thus, on performance of the right direction switch unit 604, the quick-shift motor 370 will run in a direction to cross the stock guide 54 to the right from wind-on relation with the reel on the left stand 46A over into wind-on relation with the reel on the right stand 46B (Figs. 1A and 1B). Conversely, on performance of the left direction switch unit 606, the quick-shift motor 370 will run in the opposite direction to cross the stock guide 54 to the left from wind-on relation with the reel on the right stand 46B over into wind-on relation with the reel on the left stand 46A. The right direction switch unit presently comprises three normally-open switches 604a, 604b and 604c which are ganged to each other. The left direction switch unit 606 comprises three normally-open switches 606a, 606b and 606c which are also ganged to each other. On closing the right direction switch unit 604 into the dotted-line position (Fig. 9), current will flow from one side of the A.C. line 560 through a lead 608, the starting winding 600 of the quick-shift motor 370, a lead 610, switch 604c, and a lead 612 to the other side of the A.C. line. Current will also branch from the lead 608 and pass through a lead 614, switch 604a, a lead 616, the running winding 602 of the motor 370 in the direction of the arrow 618, a lead 620, switch 604b and leads 622 and 612 to the other side of the A.C. line. On current flow in this fashion through the windings of the motor 370, the quick-shift drive will cross the stock guide 54 from left to right (Figs. 1A and 1B). On closing the left direction switch unit 606 into the dotted-line position (Fig. 9), current will flow from one side of the A.C. line through lead 608, starting winding 600 of motor 370, lead 610, a lead 624, switch 606c, and leads 626 and 628 to the other side of the A.C. line. Current will also branch from lead 608 and pass through lead 614, a lead 630, switch 606a, a lead 632, lead 620, the running winding 602 of the motor 370, this time in the direction of the arrow 634, lead 616, a lead 636, switch 606b and leads 638 and 628 to the other side of the A.C. line. On current flow in this fashion through the windings of the motor 370, the quick-shift drive will cross the stock guide 54 from right to left (Figs. 1A and 1B).

The normally-open switches of the right and left direction switch units 604 and 606 are under the control of "quick-shift" relays 640 and 642, respectively, of which the relay 640 for the right direction switch unit 604 is connected across the A.C. line 560 via a lead 644, a lead 646, a normally-closed switch 648, a lead 650, a normally-open switch 652, a lead 654, a "quick-shift" switch 656, and a lead 658. Hence, on closure of the normally-open switch 652 in a manner described hereinafter, and with the quick-shift switch 656 in its full-line position (Fig. 9), the quick-shift relay 640 will be energized, with the result that the quick-shift drive with its motor 370 will cross the stock guide from left to right (Figs. 1A and 1B). The other quick-shift relay 642 for the left direction switch unit 606 is connected across the A.C. line 560 via a lead 660, a lead 662, a normally-closed switch 664, a lead 666, a normally-open switch 668, a lead 670, the quick-shift switch 656, and the lead 658. Hence, on closure of the normally-open switch 668 in a manner to be described, and with the quick-shift switch 656 in its dotted-line position (Fig. 9), the quick-shift relay 642 will be energized, with the result that the quick-shift drive with its motor 370 will cross the stock guide from right to left (Figs. 1A and 1B).

The quick-shift switch 656 is presently mounted on a platform 672 on the spindle guide bracket 536 (Figs. 1B and 3), and has a turnable actuator 674 (see also Fig. 9A) with axially spaced lower and upper arms 676 and 678, respectively, which are in the paths of rearwardly extending limit fingers 680 and 682 on lower and upper bars 684 and 686, respectively, that are longitudinally adjustably carried by the top guide bracket 548 in the rear thereof. Assuming now that the stock guide 54 has finished a winding operation on the reel in the left stand 46A and is presently quick-shifted to the right (Fig. 1B) for the crossover of the stock from the full reel to the empty reel in the right stand 46B, the actuator 674 of the quick-shift switch 656 will then be in one of its two positions, presently the position shown in Figs. 1B, 3 and 9A and also in full lines in Fig. 9, in which its lower arm 676 extends forwardly into the path of the lower limit finger 680, while its upper arm 678 is out of the path of the upper limit finger 682. It follows from Figs. 1B and 9A that on slight further quick-shift of the stock guide to the right, the lower limit finger 680 will engage the lower arm 676 of the switch actuator 674 and start to rock the same counterclockwise as viewed in Fig. 9A, the actuator 674 thereupon snapping into its other position in which its lower arm 676 assumes the dotted-line position (Fig. 9A) and its upper arm 678 will be in the place of the arm 676 in its full-line position in Fig. 9A, i.e., in the path of the upper limit finger 682. The other position of the switch 656 just explained corresponds to its dotted-line position in Fig. 9. Hence, on concluding a winding operation on the reel in the right stand 46B and during subsequent quick-shift of the stock guide 54 to the left from the full reel over into wind-on relation with an empty reel in the left stand 46A (Figs. 1A and 1B), the upper limit finger 682 will engage the upper arm 678 of the switch actuator 674 in its path and start to rock the same clockwise as viewed in Fig. 9A, the switch actuator 678 thereupon snapping to its full-line position in Fig. 9A, which corresponds to the full-line position of the switch 656 in Fig. 9. The lower arm 676 of the switch actuator 674 is now again in the path of the lower limit finger 680, ready to be tripped by the latter during the following quick-shift of the stock guide from left to right (Figs. 1A and 1B). Every time the quick-shift switch 656 is tripped by the limit fingers 680 and 682, the quick-shift drive of the stock guide 54 in either direction is terminated as more fully described hereinafter, and the extent of the quick cross-over of the guide in either direction beyond the adjacent end flanges of both reels depends on the longitudinal adjustment of the limit fingers 680 and 682 on the guide 54, as will be readily understood.

The lay-traverse drive motor 264 may be running constantly while the winding apparatus is in operation. To this end, the motor 264 is connected across the A.C. line 560 by a lead 670 with an interposed manual switch 672.

Assuming again that the stock guide 54 is presently leading stock onto the reel on the left stand 46A for its wind thereon (Figs. 1A and 1B), the quick-shift switch 656 will then be in its full-line position in Fig. 9 in which the same closes the circuit of a reel drive control relay 674 which, when energized, closes a normally-open switch 676 in the running circuit of the motor 200A of the left reel drive 52. This running circuit comprises one side of the A.C. line 560, a lead 678, switch 676, at lead 680', the motor 200A, a lead 682', and the other side of the A.C. line 560. As already mentioned, this running circuit of the motor 200A is closed when the energized relay 674 closes the switch 676, and the circuit of the relay 674 is presently closed (Fig. 9), this circuit comprising one side of the A.C. line 560, the lead 658, the quick-shift switch 656 in its full-line position, leads 684' and 686', relay 674, a lead 688, and the other side of the A.C. line 560. Also, with the stock guide 54 leading stock for its wind on the reel in the left stand 46A and with the quick-shift switch 656 in its full-line position (Fig. 9), the clutch coil 520 and 522 of the lay-traverse drive of the guide-operating spindle 250 will alternately be energized under the control of the limit arms 542 on the rock shaft 530 (Figs. 1A and 1B).

As the reel on the left stand 46A is nearly fully wound, a normally-open master switch 690 is closed and then reopened to start several operations which conclude the winding of stock on the reel on the left stand 46A and lead to the winding of stock on the empty reel on the right stand 46B. The master switch 690 would ordinarily be closed by an associated relay which receives an electrical impulse from a stock-measuring device (neither shown) when a reel is nearly fully wound. For the sake of simplicity, however, the master switch 690 is shown as a manual normally-open switch in Fig. 9.

Closure of the master switch 690 will close the circuit of a control relay 692, which comprises one side of the A.C. line 560, a lead 694 with interposed "stand"

switches 696 and 698, the master switch 690, a lead 700 with an interposed normally-open switch 702, relay 692, a lead 704, and the other side of the A.C. line 560. The stand switches 696 and 698 (Figs. 1B and 3) are mounted on the bases 62 for the left and right reel stands 46A and 46B, respectively, and assume the full-line and dotted-line positions in Fig. 9 when the associated reel stands are in their reel-winding and reel-exchange positions, respectively. Hence, with both reel stands 46A and 46B being presently in their reel-winding positions, both stand switches assume the full-line positions in Fig. 9. The other normally-open switch 702 is, prior to the closure of the master switch 690, held closed by a holding relay 706 the circuit of which comprises one side of the A.C. line 560, a lead 708, relay 706, a lead 710, a normally-open switch 712 which is ganged with the switch 702, a lead 714, a normally-closed switch 716 which is ganged with the earlier described switch 652, a lead 718, a normally-closed switch 720 which is ganged with the previously described switch 668, a lead 722, and the other side of the A.C. line 560.

It follows from the preceding that closure of the master switch 690 will immediately close the aforementioned circuit of the control relay 692 that is associated with a switch unit 724 which comprises the previously described normally-closed switches 648 and 664, as well as normally-open switches 726, 728 and 730, all of which are ganged together. Hence, on energization of the control relay 692, the individual switches of the switch unit 724 will be shifted from their normal full-line positions into their dotted-line positions in Fig. 9. Thus, the switches 648 and 664 of the switch unit 724 will be opened, while the other switches 726, 728 and 730 will be closed. Closure of the switch 728 at this stage of an operation of the winding apparatus has no effect, but closure of the other two switches 726 and 730 will have an effect. Thus, closure of the switch 726 will close a starting circuit of a relay 732 which is associated with the ganged switches 652 and 716. This starting circuit comprises one side of the A.C. line 560, lead 658, the quick-shift switch 656 in its full-line position, lead 684, a lead 734, switch 726, a lead 736, lead 650, a lead 738, relay 732, a lead 740, and the other side of the A.C. line 560. In thus energizing relay 732 when the master switch 690 is closed, the former will close and open the ganged switches 652 and 716, respectively, and will also close normally-open switches 742 and 744 which are also ganged with the switches 652 and 716 as indicated by the dotted lines 746 and 748. The now closed switch 742 closes one of two alternate circuits of the stock-diverter control relay 514, which comprises one side of the A.C. line 560, a lead 750, switch 742, a lead 752, relay 514, a lead 754, and the other side of the A.C. line 560. Energization of the relay 514 in this fashion causes advance of the stock-diverting track 450 into its projected or operative position prior to the subsequent corssover of the stock from the left reel presently being wound to the right reel. The other closed switch 744 closes a starting circuit of the motor 200B of the right reel drive 52, which comprises one side of the A.C. line 560, a lead 756, switch 744, a lead 758, a motor 200B, a lead 760, and the other side of the A.C. line 560. Hence, the drive of the empty reel on the right stand 46B is started while stock is still being wound on the other reel.

It has already been mentioned that energization of the relay 732 on closure of the master switch 690 will not only cause closure of the switch 652, but also opening of the switch 716, with resultant opening of the aforementioned holding circuit of the relay 706 which controls the associated switches 702 and 712. However, in order that the normally-open switch 702 will then remain closed for holding the described circuit of the control relay 692 closed as long as the master switch 690 is held closed, the other closed switch 730 of the switch unit 724 closes a temporary circuit of the relay 706, which comprises one side of the A.C. line 560, a lead 762, switch 730, a lead 764, lead 714, switch 712, lead 710, relay 706, lead 708, and the other side of the A.C. line 560. Closure of the normally-open switch 652 on energization of the relay 732 with the closure of the master switch 690 will also close a holding circuit of the relay 732, which comprises one side of the A.C. line 560, lead 658, the quick-shift switch in its full-line position, lead 654, the then closed switch 652, leads 650 and 738, relay 732, lead 740, and the other side of the A.C. line 560.

It follows from the preceding that on closure of the master switch 690, while the winding of stock on the reel on the left stand 46A still continues, the stock-diverting track 450 is shifted into its projected position, and the reel drive of the empty reel on the right stand 46B is started and maintained as long as the master switch 690 is held closed. In fact, the master switch 690 is held closed until the empty reel on the right stand 46B has come up to proper speed, preferably in excess of that of the other reel being presently finish-wound. As soon as the empty reel has reached proper speed, the master switch 690 is relased for return to its normally-open position, thereby to start the quick shift of the stock guide 54 from the full left reel over to the empty right reel and simultaneously render the lay-traverse drive of the guide-operating spindle 250 inoperative, at the proper time release the crossover stock from the diverting track 450 for its nearly simultaneous anchorage to the snagger devices 144 on both reels and severance immediately thereafter, and finally render the quick-shift drive of the guide operating spindle 250 inoperative and simultaneously restore the lay-traverse drive of the latter. Thus, opening of the master switch 690 opens the circuit of the control relay 692, with the result that the switches of the switch unit 724 will return to their normal full-line positions. Among these switches, the then closed switch 648 thereof, and also the then closed switch 652 close the previously described circuit of the quick-shift relay 640, with resultant closure of the switches of the switch unit 604 and running of the quick-shift motor 370 in a direction to cause the quick-shift drive rapidly to cross the stock guide to the right (Figs. 1A and 1B) from the full reel on the left stand 46A over and beyond the adjacent end flanges 148 of both reels. Simultaneously with the start of the quick-shift drive of the guide-operating spindle 250, the lay-traverse drive of the latter is rendered inoperative by deenergization of both clutch coils 520 and 522 thereof. To this end, the normally-closed switch 564 in the aforementioned circuits of the clutch relays 520 and 522 is ganged with the switch unit 604, as indicated by dotted line 768, so as to be opened when the switches of the unit 604 are closed. Ganged with the switch 564 is a switch 770 which is closed when the former is opened, thereby closing a holding circuit of the relay 580 which comprises one side of the A.C. line 560, a lead 772, switch 770, a lead 774, lead 584 with the interposed relay 580, and the other side of the A.C. line 560. Energization in this fashion of the relay 580 will result in the shift of the ganged switches 576 and 578 from their illustrated positions into their closed and open positions, respectively, if the stock guide did travel to the right (Fig. 1A) just prior to the start of its quick crossover motion, and will in any event result in magnetically locking these switches 576 and 578 in their respective closed and open positions as long as the quick-shift drive of the guide is operative. In thus magnetically locking the switches 576 and 578 in their closed and open positions, respectively, actuation of the lay-traverse switch 524 as a result of the rocking of the limit arms 542b and 544a on the rock shaft 530 by the cam element 546 on the guide 54 on the quick crossover of the latter from the full left reel to the empty right reel (Figs. 1A and 1B) will not in any way affect the switches 576 and 578 in their magnetically-locked closed and open positions, so that the circuit of the clutch coil 520 will remain conditioned for closure immediately on interruption of the quick-shift drive of the guide and simultaneous resumption of the lay-traverse drive of the same, with the result that the stock guide will, on the subsequent restart of the lay-traverse drive, be immediately moved to the left (Fig. 1B), i.e., toward the end flange of the right reel which it crossed.

As the stock guide 54 quickly crosses from the full left reel to the empty right reel, the projected track 450 is in the path of the crossing-over stock and deflects the latter from the paths of the snagger devices on both reels, all as previously described. After the guide has thus quickly crossed beyond the adjacent end flanges of both reels to an extent determined by the adjustment of the limit finger 680 on the guide, this limit finger will actuate the quick-shift switch 656 into its dotted-line position (Fig. 9). In doing so, the aforementioned circuit of the quick-shift relay 640 is interrupted, with the result that the quick-shift drive of the guide will stop, and the lay-traverse drive will simultaneously resume its operation by virtue of the closing of the switch 564 simultaneously with the opening of the switch unit 604 with which it is ganged. Also, with the throw of the quick-shift switch 656 into the dotted-line position, the aforementioned holding circuit of the relay 732 is opened, with the result that the switches 652 and 716 will return to their normally-open and normally-closed positions, respectively, and the switches 742 and 744, which are ganged with the switches 652 and 716, will, in consequence, be returned to their normally-open positions. Opening of the switch 742 will result in deenergization of the relay 514 and, accordingly, in retraction of the track 450 from underneath the cross-over stock thereon, so that the latter will whip-like self-deflect into the path of the nearest snagger element on the adjacent end of the full left reel and be deflected thereby into the path of the nearest snagger element on the empty right reel for almost simultaneous anchorage to the snagger devices on both reels and for severance immediately thereafter, all as previously explained. Opening of the switch 744 will interrupt the aforementioned starting circuit of the motor 200B of the right reel drive, but a holding circuit of the latter motor will be closed simultaneously with the opening of its starting circuit. Thus, on the throw of the quick-shift switch 656 into its dotted-line position, the aforementioned circuit of the relay 674 is also opened, with the result that the associated switch 676 is returned to its normally-open position to interrupt the holding circuit of the left reel drive motor 200A and thus bring the latter to a stop. However, ganged with this switch 676 is another normally-closed switch 778 which on opening of the former closes a holding circuit of the right reel drive motor 200B, which comprises one side of the A.C. line 560, lead 756, a lead 780, switch 778, a lead 782, lead 758, motor 200B, lead 760, and the other side of the A.C. line 560.

The stock-winding onto the reel on the right stand 46B now proceeds, and the full left reel will be removed from the left stand 46A and replaced by an empty reel. It is, in fact, imperative that the left reel stand 46A is swung into its reel-exchange position since the controls would otherwise be ineffective to cause the next quick crossover of the stock guide from the reel on the right stand 46B to the reel on the left stand 46A. Thus, the aforementioned temporary circuit of the holding relay 706 via switch 730 of the switch unit 724 has also been opened on the preceding release of the master switch 690 into its normally-open position, with the result that the ganged switches 702 and 712 have returned to their normally-open positions. Yet, in order to condition the aforementioned circuit of the control relay 692 for immediate closure on the next closure of the master switch 690, when the reel on the right stand 46B will be nearly fully wound, it is necessary to close the switch 702 before then. This is achieved by energizing the relay 706 on swinging the left reel stand 46A into its reel-exchange position for removing the full reel therefrom and placing an empty reel thereon. In thus swinging the left reel stand 46A into its reel-exchange position, the associated stand switch 696 is shifted to its dotted-line position to close a starting circuit for the relay 706, which comprises one side of the A.C. line 560, lead 694, switch 696 in its dotted-line position, a lead 784, lead 710, relay 706, lead 708, and the other side of the A.C. line 560. In thus causing closure of the switch 702, the switch 712 ganged therewith will also be closed to close the aforementioned holding circuit of the relay 706 via the then closed switches 716 and 720, so that the relay 706 will remain energized when the left reel stand 46A is returned to its winding position and its associated switch 696 returned to its full-line position.

When the reel on the right stand 46B is nearly fully wound the master switch 690 is again closed and held closed until the empty reel on the left stand 46A has come up to proper speed, while in the meantime the stock-diverting track 450 has again been shifted into its projected position. The controls respond to closure of the master switch 690 very similarly as previously described. Thus, closure of the master switch 690 closes the circuit of the control relay 692, with resultant shift of the switches of the associated switch unit 724 into their dotted-line positions. The then closed switch 728 thereof closes a starting circuit of a relay 786, which circuit includes the quick-shift switch 656 in its dotted-line position. The energized relay 786 is associated with the ganged switches 720 and 668 and shifts them into open and closed positions, respectively, and also shifts normally-open switches 788 and 790 into closed positions because they are ganged with the switches 720 and 668 as indicated by dotted lines 792 and 794. The then closed switch 788 closes the other circuit of the relay 514 for shifting the stock-diverting track 450 into its projected position, while the other closed switch 790 closes a starting circuit of the motor 200A of the left reel drive. On release of the master switch 690 for return to its normally-open position, the circuit of the control relay 692 is opened and the switches of the associated switch unit 724 returned to their normal full-line positions. While this causes interruption of the starting circuit of the relay 786, there has previously been closed a holding circuit thereof which includes the then closed switch 668 and the quick-shift switch 656 in its dotted-line position, so that switch 720 remains open and switches 668, 788 and 790 remain closed after opening of the master switch 690, to retain the stock-diverting track 450 in its projected position and maintain the drive of the empty reel on the left stand 46A. The then closed switch 664 of the switch unit 724 closes the circuit of the quick-shift relay 642, which includes the then closed switch 668 and the quick-shift switch 656 in its dotted-line position. Energization of the relay 642 causes a shift of the normally-open switches of the associated switch unit 606 into their dotted-line positions, with resultant running of the quick-shift motor 370 in a direction to cause quick-shift of the stock guide 54 from the full reel on the right stand 46B over to the left into wind-on relation with the reel on the left stand 46A. Such shift of the switches of the unit 606 also causes opening of the switch 568 since the latter is ganged with the switch unit 606 as indicated by the dotted line 798. This switch 568 is in the circuits of the clutch coils 520 and 522 and, by being opened in this fashion, renders the lay-traverse drive of the guide inoperative the moment the quick-shift drive thereof is operative. Ganged with the switch 568 is a switch 800 which, on opening of the former, is closed to thereby close a holding circuit of the relay 582 for magnetically locking the associated switches 576 and 578 in the positions shown (Fig. 9), with the then closed switch 578 governing the first direction of the stock guide 54, this time to the right (Figs. 1A and 1B) on resumption of the lay-traverse drive thereof.

The stock guide 54, in thus being quick-shifted from the right reel to the left reel, crosses the stock over to the left reel, and the crossover stock will again be deflected by the projecting track 450 out of the paths of the snagger devices on both reels. Engagement of the other limit finger 682 on the stock guide with the quick-shift switch 656 and resultant shift of the latter into its full-line position (Fig. 9) concludes the quick crossover of the guide and causes retraction of the track 450 from beneath the crossover stock thereon for whip-like self-deflection of the latter into the path of the nearest snagger element on the right reel and its deflection thereby into the path of the nearest snagger element on the left reel and its nearly simultaneous anchorage to the snagger devices on both reels and severance immediately thereafter, all as previously explained. Thus, return of the quick-shift switch 656 to its full-line position interrupts the holding circuit of the relay 786, with resultant return of the switch 720 to its normally-closed position, and return of the associated switch 668 to its normally-open position and, accordingly, interruption of the circuit of the quick-shift relay 642. With the relay 642 thus deenergized, the associated switch unit 606 will return to its normal open position and also reclose the switch 568 with which it is ganged. Reclosure of the switch 568 will recondition the circuits of the clutch coils 520 and 522 for closure by the respective switches 576 and 578 under the control of the lay-traverse switch 524. With switch 578 being presently closed, the lay-traverse drive of the guide will become immediately operative and move the latter to the right for the first time. Simultaneously with the release of the switches 720 and 668 for return into their normal positions, the switches 788 and 790 ganged therewith will also be returned to their normally-open positions, causing retraction of the projected stock-diverting track 450 and interruption of the starting circuit of the left reel drive motor 200A. However, on the throw of the quick-shift switch 656 into its full-line position, the circuit of the relay 674 is again closed, causing closure of the associated switch 676 and opening of the associated switch 778. Closure of the switch 676 causes closure of the holding circuit of the left reel drive motor 200A, while opening of the switch 778 stops the drive of the right reel. The preceding release of the master switch 690 for return to its normally-open position also caused opening of the temporary circuit of the holding relay 706 via switch 730 of the switch unit 724, and thus released the switches 702 and 712 for return to their normally-open positions. However, while the stock guide now leads stock onto the left reel for its wind thereon, the right stand 46B is swung to its reel-exchange position for replacing the full reel thereon with an empty reel, shifting thereby the associated stand switch 698 into its dotted-line position for closing a starting circuit of the relay 706 and thereby causing closure of both associated switches 702 and 712, of which the then closed switch 712 closes the holding circuit of the relay 706 via the then closed switches 716 and 720. Accordingly, the switch 702 remains closed and thereby conditions the circuit of the control relay 692 for immediate closure on subsequent closure of the master switch 690 for a renewed crossover of the stock, this time from the left reel, when it is nearly wound, over into wind-on relation with the empty right reel.

While the stock, in being quick-shifted from wind-on relation with either reel into wind-on relation with the other reel, must cross at least beyond the adjacent end flanges of both reels before being released from the diverting track 450, the stock need not be crossed beyond the adjacent end flanges of both reels to the exaggerated extent shown in Fig. 1B before its release from the diverting track 450. In fact, it is advantageous to retract the stock-diverting track 450 from its projected position on the shortest possible crossing of the stock beyond the end flanges of both reels in order to wind the first stock turns on the empty reel as close as possible to the end flange thereof which carries the snagger device. Of course, the extent of the quick crossover of the guide 54 beyond the adjacent end flanges of both reels before retraction of the stock-diverting track 450 may be made to suit by merely adjusting the limit fingers 680 and 682 on the guide 54 longitudinally thereof, as will be readily understood. The extent of the quick crossover of the guide 54 beyond the adjacent end flanges of both reels at the time of retraction of the stock-diverting track 450 may be kept at the bare minimum required to assure that the crossover stock will, on its release from the track 450, self-deflect into the path of the nearest snagger element on the full reel and be diverted by this snagger element into the path of the nearest snagger element on the empty reel within less than one-half revolution of the full reel from its momentary angular position in which the stock became anchored to the snagger device thereon. Of course, the minimum permissible extent of the crossover of the guide 54 beyond the adjacent end flanges of both reels depends on certain factors, such as the vertical adjustment of the guide-roll carrier 238 on the guide bracket 240, the axial distance between the snagger devices 144 from each other, the axial distance of the snagger elements 172 from their adjacent reel end flanges 148 and the thickness of the latter if the snagger elements 172 are arranged to one side of their adjacent reel end flanges as in the present example, and last, but not least, the extent to which the snagger elements 172 project radially beyond the peripheral confines of their adjacent reel end flanges 148.

In order that the snagger devices 144 on both reels may perform their designated functions of self-anchoring the released crossover stock nearly simultaneously, as described, it is, of course, imperative that the empty reel is, on the release of the crossover stock from the diverting track 450 driven at least at substantially the same speed as the full reel. However, it is advantageous to drive the empty reel at that time at considerably greater speed than the full reel, and more particularly at a higher speed at which the wind-on speed of the stock onto the empty reel will be substantially the same as its wind-on speed onto the other reel when nearly full, so as to obtain the least reaction of the stock accumulator 58 to each switch of a winding operation from one reel to the other reel. While not necessary for the aforementioned nearly simultaneous anchorage of the released crossover stock to the snagger devices on both reels, this higher speed of the empty reel is also advantageous for this very purpose. Thus, a snagger element 172 on the full reel will usually ram against and anchor the released crossover stock before a snagger element on the empty reel will engage the stock. The crossover stock will usually be deflected by its engaging snagger element on the full reel into the path of the nearest snagger element on the empty reel and, in being thus deflected, may cross the path of the latter snagger element at a considerable inclination thereof. Hence, the aforementioned higher speed of the empty reel at that time is advantageous, in that the snagger element thereon nearest to the deflected stock will ram against the latter with greater speed and, hence, with greater force and assuredly anchor the stock despite its inclination thereto. To the end of achieving the drive of both reels at the aforementioned differential speeds at each stock crossover, and also achieving the drive of each reel at varying speed for uniformity of the wind-on speed of stock onto each reel despite the steadily varying wind-on diameter of each reel being wound, there are preferably provided additional controls for varying the output speed of each of the motors 200 of the reel drives 52. However, since these additional controls form no part of the present invention and may, moreover, be entirely conventional, they are not shown.

While the exemplary arrangement of the stock-diverting track 450, the stock guide 54 and the snagger devices 144 on their adjacent reel end flanges 148 is such that, on release of the crossover stock from the track 450, the released stock will self-deflect into the path of the nearest snagger element 172 on the full reel and be deflected thereby into the path of the nearest snagger element on the empty reel, as described, it is, of course, entirely feasible to arrange these parts so that the released crossover stock will whip-like self-deflect into the paths of snagger elements on both reels. Thus, on constructing and arranging the track 450 so that the same will in its projected position be considerably closer to the snagger devices 144 than is shown in Fig. 1B, and on vertically adjusting the guide-roll carrier 238 on the guide bracket 240 for minimum clearance from the projected track 450 when passing the latter, it may well be that the crossover stock will, on its release from the track 450, whip-like self-deflect into the paths of snagger elements on both reels.

While in the described winding apparatus of Figs. 1A, 1B, 2 and 3 the crossover stock is released from the retracting stock-diverting track 450 for advantageous whip-like self-deflection into the path of the nearest snagger element on at least the full reel, substantially all the advantages of a stock-diverting track are retained if the crossover stock is transferred from the track into the path of the nearest snagger element on at least the full reel in most any manner other than by whip-like self-deflection of the stock. Thus, Figs. 10 and 11 show a modified winding apparatus 20a which may in all respects be like the described winding apparatus 20, except that the stock-diverting track 450a is tiltable instead of rectilinearly projectible and retractible. To this end, the track end sections 452a are longitudinally adjustably carried by a rocker 810 which at 812 is pivoted to spaced arms 814 of a bracket 816 that is, in turn, pivoted at 818 to the upright arm 468a on the rear frame bar 34a. The bracket 816 is held in level-adjustable forwardly projected position on the upright arm 468a by the link 472a which is bolted at 474a and 476a to the bracket 816 and to the side lug 478a on the upright arm 468a, respectively, the link being provided with a series of holes 477a for its adjustable bolting to the side lug 478a on the upright arm 468a. The cylinder 486a is at its rear end pivoted at 820 to an upstanding lug 822 on the bracket 816, and the rod 482a of the plunger therein is pivoted at 824 to a depending lug 826 on the rocker 810.

During crossover of the stock s by the guide 54a from either reel over to the other reel, presently from the left reel 142A to the right reel 142B, the track 450a is in its upper full-line position in which it is in the path of the crossover stock and diverts the same from the paths of the snagger elements 172x on both reels. However, at the end of the quick-shift of the guide 54a from wind-on relation with the full left reel 142A into wind-on relation with the empty right reel 142B, the cylinder 486a is actuated to retract the plunger rod 482a, thereby tilting the track 450a downwardly into its dotted-line position (Fig. 10) in which the crossover stock thereon is in the path of the nearest snagger element on at least the full reel 142A, presently the snagger element 172x' in Fig. 10 which will shortly ram against the crossover stock and not only anchor the same but also draw it clear of the lowered track 450a, even from the right end section 452a thereof (Fig. 11). This snagger element 172x' will then deflect the crossover stock into the path of the nearest snagger element on the empty right reel for its anchorage thereto. The cylinder 486a is thereupon actuated to project the plunger rod 482a forwardly in order to tilt the track 450a back to its upper position in which it will be in the path of the stock on the next crossover of the latter from the right reel to the left reel.

It is quite evident that it is the stock-diverting function of the diverter track which is chiefly responsible for the nearly simultaneous anchorage of the crossover stock to the snagger devices on both reels regardless of the crossover speed of the stock guide. Thus, by diverting the crossover stock from the paths of the snagger devices on both reels until the stock has crossed beyond the adjacent end flanges of both reels, the diverter track has met the basic requirement which alone will permit nearly simultaneous anchorage of the crossover stock to the snagger devices on both reels regardless of the mode of transfer of the crossover stock from the diverter track to these snagger devices. To achieve nearly simultaneous anchorage of the crossover stock to the snagger devices on both reels, it is not at all imperative that the crossover stock, on its release from the diverter track, is in the path of the snagger elements on at least the reel from which it crossed over. Thus, Figs. 12 and 13 show a further modified winding apparatus 20b which may in all respects be like the described winding apparatus 20 of Figs. 1A, 1B, 2 and 3, including the rectilinearly projectible and retractible stock-diverting track thereof, except that the present modified apparatus is provided with a fixed crossover stock deflector 830 which is in the form of a plate having a cam-like stock-deflecting edge 832 that is preferably well rounded cross-sectionally so as not to sever the crossover stock on engagement therewith. The stock deflector plate 830 is presently bolted at 834 to an upright forward arm 836 on the base 126b of the center bracket 124b.

In the present example, the end flanges 148b of the reels 142b are of such large diameters that the crossover stock s, on its release from the diverter track 450b (Fig. 13), will on its whip-like self-deflection stay out of reach of the snagger elements 172b on even the left reel from which it crossed over. However, the released crossover stock will be in following traction with the adjacent reel end flange 148b from which it crossed, presently the end flange 148b' of the left reel, so that the released crossover stock is taken along by the latter and thus forced to pass the stock deflector 830 in its path. As the crossover stock thus passes the stock deflector 830, it is by the cam-like edge 832 of the latter deflected inwardly sufficiently to bring it into the paths of the nearest snagger elements on both reels for its nearly simultaneous anchorage to them.

The stock deflector 830 is also of advantage where the crossover stock s, on its release from the diverter track 450b, will on its whip-like self-deflection be just caught by the nearest snagger element on the reel from which it crossed over, but would not be deflected by this snagger element into the path of the nearest snagger element on the other reel if it were not for the described inward deflection of the crossover stock by the present deflector 830.

The stock diverting track may also be used to good advantage for winding any desired leading length of stock on the wedge-type snagger device on each reel before commencing the stock wind on the latter, thereby to have immediately accessible and available for certain well-known uses an assuredly adequate leading length of the stock on each fully-wound reel. Thus, the reel-winding apparatus 20c of Fig. 14 may in all respects be like the described winding apparatus 20 of Figs. 1A, 1B, 2 and 3, except that the present apparatus has a stock-diverting track 450c which, in addition to its primary function of diverting the crossover stock from the paths of the snagger elements 172c on both reels 142c and then releasing it for its nearly simultaneous anchorage to snagger elements on both reels, performs the further function of leading the crossover stock for the wind of any desired turns thereof onto a wind-on rim 840 on the snagger device 144c on each reel 142c to be wound next. To this end, the stock-diverting track 450c comprises separate track sections 842, presently in the form of anti-friction rollers, which are individually operable into two different positions to divert crossover stock from the paths of the snagger elements on both reels and for transfer of the crossover stock therefrom, respectively. In the present example, the separate track sections 842 are individually operable into the aforementioned two positions by being rectilinearly projectible and retractible. To this end, each track section 842 is adjustably mounted at 844 on a slide 846 which is guided for rectilinear movement in a bracket 848 that is pivoted at its rear to an upright arm 468c on the rear frame bar 34c and held in level-adjustable forwardly projected position on the arm 468c by a link 472c. Connected at 850 with a lug 852 on each slide 846 (Fig. 15) is the rod 482c of a plunger in a cylinder 486c on the bracket 848. Each of the cylinders 486c may be like the cylinder 486 in Fig. 8 and be under the control of a valve such as valve 502 in the same Fig. 8. Accordingly, each cylinder 486c holds its track section 842 retracted when the spring in its control valve urges the valve element therein into normal valve position. Conversely, each cylinder 486c holds its track section 842 projected when the control relay of its control valve is energized to shift the valve element in the latter into operative valve position. The control relays for the valves of the actuating cylinders 486c of the left and right track sections 842A and 842B are shown in Fig. 16 as the relays 854 and 856, respectively.

As shown in Fig. 14, each track section 842 substantially bridges the adjacent reel and flange 148c. Assuming that the controls of the present apparatus are like the controls shown in Fig. 9, except for some changes explained hereinafter, and further assuming that the left reel 142c (Fig. 14) is nearly finish-wound, the master switch 690 (Fig. 9) is closed and reopened to start a cycle performance of the controls. Thus, the drive of the right empty reel will be started and both relays 854 and 856 energized (Fig. 16) for shifting the track sections 842 into their projected positions. The lay-traverse drive of the guide 54c will then become inoperative and the quick-shift drive thereof will simultaneously become operative for the quick-crossover of the guide 54c from the nearly-full left reel to the empty right reel. The stock s will on its crossover be deflected by the left track section 842A from the paths of the snagger elements on both reels. At the end of the quick crossover of the guide 54c, when the same reaches substantially the exemplary position in Fig. 14, the control relay 854 for the actuating cylinder of the left track section 842A is deenergized, resulting in immediate retraction of the latter from the crossover stock and whip-like self-deflection of the released stock into the path of the nearest snagger element on the full left reel and deflection thereby into the path of the nearest snagger element on the empty right reel, with resultant nearly-simultaneous anchorage of the stock to the snagger devices on both reels, substantially as shown in Fig. 14, and severance of the crossover stock shortly thereafter. The lay-traverse drive of the guide 54c will resume its operation immediately on interruption of the quick-shift drive thereof, and, in accordance with the exemplary controls of Fig. 9, move the guide 54c at the slower traverse speed to the left for the first time (Fig. 14). However, the right track-section 842B is still in its projected position, with the result that the crossover stock, when once anchored to the snagger device on the empty right reel, will be led by the track section 842B into wind on the rim 840 on the snagger device on this empty right reel until the track section 842B is retracted. On retraction of the track section 842B from its projected position, the stock thereon will be released for whip-like self-deflection against the adjacent end flange of the empty right reel and taken along by the same to start its wind on the latter reel. While the winding of stock on the right reel proceeds, the fully-wound left reel is replaced by an empty reel. When the right reel is nearly finish-wound, the master switch 690 (Fig. 9) is again closed and reopened to start another operating cycle of the controls for switching the winding operation from the right reel to the empty left reel. In this switch, however, the right track section 842B will, at the end of the quick crossover of the guide 54c, be retracted for releasing the crossover stock for nearly simultaneous anchorage to the snagger devices on both reels, while the other or left track section 842A will remain projected for the subsequent wind of crossover stock, when anchored to the snagger device on the empty left reel, onto the rim 840 of the latter snagger device. On subsequent retraction of the left track section 842A, the stock released therefrom will whip-like self-deflect against the adjacent end flange of the empty left reel and be taken along thereby for starting its wind on the latter reel.

An exemplary automatic control for the valve relays 854 and 856 of the actuating cylinders of the left and right track sections 842A and 842B is illustrated in Fig. 16. The controls there shown take the place of the controls of the stock-diverter track relay 514 in Fig. 9, and the operating controls of the apparatus of Fig. 14 may otherwise be like the controls of Fig. 9. Thus, the switches 742c and 788c (Fig. 16) correspond to the switches 742 and 788 in Fig. 9 and are opened and closed when the latter are opened and closed. Also, the ganged switches 576c and 578c (Fig. 16) correspond to the ganged switches 576 and 578 (Fig. 9), the former being shifted to either position by relays 580c and 582c which correspond to the relays 580 and 582, respectively (Fig. 9). The ganged switches 576c and 578c are preferably also mechanically locked in either position like their counterparts of Fig. 9. The switches 742c and 788c, which are connected in parallel with each other, are in series connection with a relay 860 (Fig. 16). To this end, the switches 742c and 788c are interposed in leads 862 and 864, respectively, which branch from one side of the A.C. line 560c and connect with a lead 866 which branches from the other side of the A.C. line 560c and in which the relay 860 is interposed. The relay 860 controls ganged normally-open switches 868 and 870 in the primary circuits of the diverter track relays 854 and 856 respectively. The switch 576c is in a holding circuit of the diverter track relay 856, which comprises one side of the A.C. line 560c, a lead 872, switch 576c, a lead 874, a normally-open switch 876, a lead 878, a lead 880 in which relay 856 is interposed, and the other side of the A.C. line 560c. The switch 876 in the holding circuit of the diverter track relay 856 is under the control of a relay 882 which has a starting circuit, comprising one side of the A.C. line 560c, a lead 884, relay 882, a lead 886, lead 878, a lead 890 in which switch 870 is interposed, and the other side of the A.C. line 560c. Relay 882 has also a holding circuit, which comprises one side of the A.C. line 560c, lead 872, switch 576c, lead 874, switch 876, leads 878 and 886, relay 882, lead 884, and the other side of the A.C. line 560c.

The switch 578c is in a holding circuit of the other diverter track relay 854, which comprises one side of the A.C. line 560c, a lead 892, switch 578c, a lead 894, a normally-open switch 896, a lead 898, a lead 900 in which relay 854 is interposed, and the other side of the A.C. line 560c. The switch 896 in the holding circuit of the diverter track relay 854 is under the control of a relay 902 which has a starting circuit, comprising one side of the A.C. line 560c, a lead 904, relay 902, a lead 906, lead 898, a lead 908 in which switch 868 is interposed, and the other side of the A..C line 560c. Finally, relay 902 has also a holding circuit, which comprises one side of the A.C. line 560c, lead 892, switch 578c, lead 894, switch 896, leads 898 and 906, relay 902, lead 904, and the other side of the A.C. line 560c Assuming now that the guide 54c presently leads stock s onto the left reel (Fig. 14) for its wind thereon and that this reel is nearly fully wound, the master switch 690 (Fig. 9) will then be closed to start the drive of the right reel and also cause closure of the switch 742c (Fig. 16), thereby closing one of the circuits of the relay 860 and keeping it closed until the guide 54c has finished its quick crossover from the full left reel to the empty right reel. Accordingly, on energization of the relay 860, the associated switches 868 and 870 will be closed to cause energization of both diverter track relays 854 and 856 for forward projection of both track sections 842 until the end of the quick crossover of the guide 54c. Also, with the closure of the master switch 690, the aforementioned starting circuits of the relays 882 and 902 will be closed via the then closed switches 876 and 868, respectively, causing closure of the switches 870 and 896 in the holding circuits of the relays 882 and 902, respectively.

With the release of the master switch 690 for return to its normally-open position, the quick-shift drive of the guide 54c will become operative, and the crossover stock will by the left projected track section 842A be diverted from the paths of the snagger elements on both reels. With the start of the quick-shift of the guide 54c, the relay 580c (Fig. 16) will also act magnetically to lock the ganged switches 576c and 578c in their illustrated positions, with switch 576c closed, until the end of the quick-shift of the guide 54c.

With the arrival of the guide 54c at the end of its quick crossover and resultant resumption of the lay-traverse drive of the guide, the switch 742c will be returned to its normally-open position, causing thereby deenergization of the relay 860 and release of the associated switches 868 and 870 for return into their normally-open positions which, in turn, causes deenergization of the diverter track relay 854 and, hence, retraction of the left track section 842A from beneath the crossover stock. However, the right track section 842B will remain projected, this by virtue of the previous closure of the aforementioned holding circuit of the associated relay 856 at the magnetically retained closed switch 576c. Accordingly, when the guide 54c reaches the end of its quick crossover, the left track section 842A is retracted, but the right track section 842B remains projected, with the result that the crossover stock is released from the left track section and will whip-like self-deflect into the path of the nearest snagger element on the left reel and be diverted thereby into the path of the nearest snagger element on the empty right reel for nearly simultaneous anchorage of the stock to the snagger devices on both reels and its immediate severance thereafter. However, since the stock s still passes over the right projected track section 842B, the latter will lead the stock, when anchored to the snagger device on the empty right reel, into wind on the rim 840 on the latter snagger device while the stock guide moves at the slower traverse speed toward the left end flange of the empty right reel. When the guide 54c reaches the end of its traverse motion to the left for the first time, the switches 576c and 578c will be shifted to their other positions, and with switch 576c now open, the holding circuit of the diverter track relay 856 will be opened with resultant retraction of the associated right track section 842B and release of the stock therefrom for its wind on the empty right reel. It is not believed necessary to describe the performance of the controls of Fig. 16 for the subsequent switch of the winding operation from the right reel to the replaced empty reel on the left, for their performance to this end is now apparent. It may be stated, however, that on this next shift of the winding operation, the right track section 842B will be retracted first, while the left track section 842A is retracted last for the wind of stock onto the rim 840 on the snagger device on the left reel.

The present arrangement of a divided stock-diverting track and of independent operability of each separate track section thereof is further advantageous in that it provides the winding apparatus with a stock-diverting track for winding stock on the rims of snagger devices, or for omitting snagger-winding altogether in the winding of reels with snaggers without wind-on rims. Thus, this may readily be achieved by providing suitable operating controls for the individual track sections which permit their alternative operations to that end. To the end of winding stock on reels with snagger devices without wind-on rims, or winding stock on reels carrying snagger devices with wind-on rims without, however, winding stock on the latter, it is merely necessary to retract both track sections simultaneously, or project and retract the track sections alternately, as will be readily understood.

The winding apparatus 20d of Fig. 17 may in all respects be like the winding apparatus 20c of Fig. 14. However, the adjacent end flanges 148d of both reels 142d are provided with shoulders 910 in the path of the stock s wound on the rims 840d of the snagger devices 144d on the respective reels and released from the adjacent associated track section 842d, so that these shoulders 910 will take the stock around in the fashion shown in Figs. 17 and 18 and thus start its wind on the respective reel immediately. Thus, the stock s, on the first lay-traverse return of the guide 54d to its left end position as shown in Fig. 17, has just been released from the right track section 842d, and its traction on the adjacent end flange 148d of the right reel would be insufficient to follow the latter, so that in the absence of the shoulders 910 the stock guide would traverse some distance to the right before the stock would be taken around with the adjacent end flange of the right reel and start its wind on the latter some distance away from the former, with the disadvantage that stock would be wound over the taut stock length extending from the adjacent end flange of the reel to the first stock turn on the latter. However, the nearest shoulder 910 will immediately catch the released stock and take it along for its immediate wind on the reel. The shoulders 910 are arranged near the peripheries of the end flanges of the reels, but preferably inside their peripheral confines so that the reels may be rolled on the floor without interference from these shoulders. Also, the shoulders 910 are on their inner faces preferably hook-shaped, as at 912 (Fig. 19), so as to draw or cam the stock against the associated reel end flange.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward the paths of said snagger means, of track means in the path of crossing-over stock on which the latter is diverted from the paths of said snagger means, and means for transferring the crossed-over stock from said track means into the path of the snagger means on at least the reel from which it crosses over.

2. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the one reel from which it crosses over, of track means in the path of crossing-over stock on which the latter is diverted from the paths of said snagger means, and means for transferring the crossed-over stock from said track means into the path of the snagger means on at least said one reel.

3. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward the paths of said snagger means, of a longitudinal track bridging the adjacent reel ends and being in the path of crossing-over stock on which the latter is diverted from the paths of said snagger means, and means for transferring the crossed-over stock from said track into the path of the snagger means on at least the reel from which it crosses over.

4. The combination in reel-winding apparatus as set forth in claim 3, in which said track comprises longitudinally spaced end sections.

5. The combination in reel-winding apparatus as set forth in claim 3, in which said track comprises longitudinally spaced end sections in the form of rotary rollers.

6. The combination in reel-winding apparatus as set forth in claim 3, in which said track is longitudinally adjustable relative to the supported reels.

7. The combination in reel-winding apparatus as set forth in claim 3, in which said track provides separate longitudinal end sections independently longitudinally adjustable relative to each other.

8. The combination in reel-winding apparatus as set forth in claim 3, in which said track is adjustable toward and away from the axes of the supported reels.

9. The combination in reel-winding apparatus as set forth in claim 3, in which said track is adjustable toward and away from the axes of the supported reels, and said track comprises separate longitudinal end sections independently longitudinally adjustable relative to each other.

10. In reel-winding apparatus, the combination with means for removably supporting axially aligned rotary reels having opposite end flanges and wind-on rims therebetween and being provided on their adjacent end flanges outside the axial extent of their rims with peripheral snagger means, respectively, which self-anchor crossing stock in their paths on engagement therewith, separate drives for the supported reels, and a stock guide operative to cross stock-under-tension from wind-on relation with either reel rim over into wind-on relation with the other reel rim and simultaneously deflect the crossing-over stock progressively closer toward the paths of said snagger means, of track means bridging the adjacent reel end flanges and being in the path of crossing-over stock on which the latter is diverted from the paths of said snagger means and also out of following traction with, but in close proximity to, the adjacent reel end flange from which it crosses over, and means for transferring the crossed-over stock from said track means into the path of the snagger means on at least the reel from which it crosses over.

11. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means, of a track in the path of crossing-over stock on which the latter is diverted from the paths of said snagger means, and means for releasing the crossed-over stock from said track for its whip-like self-deflection into the path of the snagger means on at least the reel from which it crosses.

12. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the one reel from which it crosses over, of a track bridging the adjacent reel ends and being movable into an operative position in which it is in the path of crossing-over stock and diverts the same from the paths of said snagger means, and movable from said operative position to release the crossed-over stock for its whip-like-self-deflection into the path of the snagger means on at least said one reel, and means for moving said track.

13. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward the paths of said snagger means, of a track in the path of the crossing-over stock on which the latter is diverted from the paths of said snagger means and from following traction with that one of the adjacent reel ends from which it crosses over, means for transferring the crossed-over stock from said track into following traction with said one reel end, and a stock deflector between the adjacent ends of the supported reels and in the path of crossed-over stock in following traction with said one reel end to cam the passing stock inwardly toward the reel axes into the paths of said snagger means.

14. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on that one of the adjacent reel ends from which it crosses over, of a track in the path of the crossing-over stock on which the latter is diverted from the paths of said snagger means, means for transferring the crossed-over stock from said track into the path of the snagger means on said one reel end, and a stock deflector between the adjacent ends of the supported reels and in the path of the crossed-over stock anchored to the snagger means on said one reel end to cam the passing stock inwardly toward the reel axes into the path of the snagger means on the other reel end.

15. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the one reel from which it crosses over, of a longitudinal track having end sections over the adjacent reel ends, respectively, flanking the snagger means on the latter on opposite sides, said track being movable into a raised position in which it is in the path of crossing-over stock and diverts the same from the paths of said snagger means, and movable into a lowered position to admit the crossed-over stock into the path of the snagger means on at least said one reel for transfer and anchorage thereon, and means for moving the track into said raised and lowered positions.

16. The combination in reel-winding apparatus as set forth in claim 15, in which said track is pivotally mounted for its movement into said raised and lowered positions.

17. In reel-winding apparatus, the combination with means for removably supporting axially aligned rotary reels having on their adjacent ends peripheral snagger means which self-anchor crossing stock in their paths on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the one reel from which it crosses over, of two tracks over the adjacent ends, respectively, of the supported reels with which they are associated, each track being movable, independently of the other track, into a first position in which the same is in the path of stock crossing-over from the associated reel to divert the same from the paths of the snagger means on both adjacent reel ends, and into a second position for its retraction from the crossed-over stock and release of the latter for whip-like self-deflection into the path of the snagger means on at least the associated reel, and means for moving each track, independently of the other track, into said first and second positions.

18. In reel-winding apparatus, the combination with means for removably supporting axially aligned rotary reels with opposite end flanges of which each of the adjacent end flanges of the reels has peripheral snagger means and a rim between the latter and the outer face of the flange, with the snagger means acting to self-anchor crossing stock in the path thereof on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the reel from which it crosses over, of two tracks bridging the adjacent end flanges, respectively, of the supported reels with which they are associated, so that each track is in the path of stock crossing-over from the associated reel and diverts the same from crossover on the adjacent end flange of the latter and from the paths of the snagger means on both reels, and means for transferring the crossed-over stock from either track independently of the other track into crossover on the adjacent end flange of the associated reel, said tracks and the snagger means on their associated reels being so coordinated that stock transferred from either track by which it was diverted from the paths of the snagger means on both reels into crossover on the adjacent end flange of the associated reel will be in the path of the snagger means on at least the latter reel, and each of said tracks also leading crossed-over stock thereon, when anchored to the snagger means on the associated reel, onto the rim of the latter for its wind thereon.

19. In reel-winding apparatus, the combination with means for removably supporting axially aligned rotary reels with opposite end flanges of which each of the adjacent end flanges of the reels has peripheral snagger means and a rim between the latter and the outer face of the flange, with the snagger means acting to self-anchor crossing stock in the path thereof on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the reel from which it crosses over, of two tracks bridging the adjacent end flanges, respectively, of the supported reels with which they are associated, so that each track is in the path of stock crossing-over from the associated reel and diverts the same from crossover on the adjacent end flange of the latter and from the paths of the snagger means on both reels, and means for releasing the crossed-over stock from either track independently of the other track for its whip-like self-deflection into crossover on the adjacent end flange of the associated reel, said tracks and the snagger means on their associated reels being so coordinated that stock released from either track by which it was diverted from the paths of the snagger means on both reels will self-deflect into the path of the snagger means on at least the associated reel, and each of said tracks also leading crossed-over stock thereon, when anchored to the snagger means on the associated reel, onto the rim of the latter for its wind thereon.

20. In reel-winding apparatus, the combination with means for removably supporting axially aligned rotary reels with opposite end flanges of which each of the adjacent end flanges of the reels has peripheral snagger means and a rim between the latter and the outer face of the flange, with the snagger means acting to self-anchor crossing stock in the path thereof on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the reel from which it crosses over, of two tracks bridging the adjacent end flanges, respectively, of the supported reels with which they are associated, each track being movable, independently of the other track, into a first position in which it is in the path of stock crossing-over from the associated reel and diverts the same from crossover on the adjacent end flange of the latter and from the paths of the snagger means on both reels, and into a second position for its retraction from the crossed-over stock and release of the latter for whip-like self-deflection into crossover on the adjacent end flange of the associated reel, said tracks and the snagger means on their associated reels being so coordinated that stock released from either track by which it was diverted from the paths of the snagger means on both reels will self-deflect into the path of the snagger means on at least the associated reel, and each track in said first position also leading crossed-over stock thereon, when anchored to the snagger means on the associated reel, onto the rim of the latter for its wind thereon, and means for moving each track into said first and second positions independently of the other track.

21. In reel-winding apparatus, the combination with means for removably supporting axially aligned rotary reels with opposite end flanges of which each of the adjacent end flanges of the reels has peripheral snagger means and a rim between the latter and the outer face of the flange, with the snagger means acting to self-anchor crossing stock in the path thereof on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the reel from which it crosses over, of two tracks bridging the adjacent end flanges, respectively, of the supported reels with which they are associated, so that each track is in the path of stock crossing-over from the associated reel and diverts the same from crossover on the adjacent end flange of the latter and from the paths of the snagger means on both reels, means for transferring the crossed-over stock from either track independently of the other track into crossover on the adjacent end flange of the associated reel, said tracks and the snagger means on their associated reels being so coordinated that stock transferred from either track by which it was diverted from the paths of the snagger means on both reels into crossover on the adjacent end flange of the associated reel will be in the path of the snagger means on at least the latter reel, and each of said tracks also leading crossed-over stock thereon, when anchored to the snagger means on the associated reel, onto the rim of the latter for its wind thereon, and a peripheral shoulder on each of said adjacent reel end flanges in the path of stock crossing from the associated rim over and on the end flange for taking the stock along.

22. The combination in reel-winding apparatus as set forth in claim 21, in which said shoulders are provided on the outer faces, respectively, of said adjacent reel end flanges within the peripheral confines of the latter.

23. The combination in reel-winding apparatus as set forth in claim 21, in which said shoulders are provided on the outer faces, respectively, of said adjacent reel end flanges within the peripheral confines of the latter, and are hook-shaped to draw the stock against the outer faces of the respective end flanges.

24. In reel-winding apparatus, the combination with means for removably supporting axially aligned rotary reels with opposite end flanges of which each of the adjacent end flanges of the reels has peripheral snagger means and a rim between the latter and the outer face of the flange, with the snagger means acting to self-anchor crossing stock in the path thereof on engagement therewith, separate drives for the supported reels, and a stock guide operative to cross stock-under-tension from wind-on relation with either reel over into wind-on relation with the other reel and simultaneously deflect the crossing-over stock progressively closer toward said snagger means and into the path of the snagger means on at least the reel from which it crosses over, of two tracks bridging the adjacent end flanges, respectively, of the supported reels with which they are associated, so that each track is in the path of stock crossing-over from the associated reel and diverts the same from crossover on the adjacent end flange of the latter and from the paths of the snagger means on both reels, a device associated with each track and operative to transfer the crossed-over stock from the latter into crossover on the adjacent end flange of the associated reel, said tracks and the snagger means on their associated reels being so coordinated that stock transferred from either track by which it was diverted from the paths of the snagger means on both reels into crossover on the adjacent end flange of the associated reel will be in the path of the snagger means on at least the latter reel, and each of said tracks also leading crossed-over stock thereon, when anchored to the snagger means on the associated reel, onto the rim of the latter for its wind thereon, and control means acting on each stock crossover beyond said adjacent reel end flanges to operate the stock transfer device associated with the track first crossed by the stock, and subsequently acting to operate the other stock transfer device, so as to wind crossover stock onto the rim of each reel before winding the stock onto the latter.

25. In reel-winding apparatus, the combination with means for removably supporting axially aligned rotary reels with opposite end flanges, separate drives for the supported reels, and a stock guide operative to cross stock from wind-on relation with either reel over into wind-on relation with the other reel and simultaneously lead the crossing-over stock into following engagement with the end flange it crosses of the reel from which it crosses over, of track means in the path of crossing-over stock on which the latter is diverted from following engagement with the end flange it crosses of the reel from which it crosses over, and means for transferring the crossed-over stock from said track means into following engagement with the end flange it crosses of the reel from which it crosses.

References Cited in the file of this patent

UNITED STATES PATENTS

| | | |
|---|---|---|
| 2,323,677 | Reh | July 6, 1943 |
| 2,653,773 | Davis | Sept. 29, 1953 |
| 2,735,629 | Hicks et al. | Feb. 21, 1956 |
| 2,779,545 | Hauck et al. | Jan. 29, 1957 |

FOREIGN PATENTS

| | | |
|---|---|---|
| 690,100 | Great Britain | Apr. 15, 1953 |